(12) United States Patent
Horimizu et al.

(10) Patent No.: US 11,198,599 B2
(45) Date of Patent: Dec. 14, 2021

(54) VEHICLE LIFT DEVICE

(71) Applicant: YASUI CORPORATION, Shizuoka (JP)

(72) Inventors: Toshihide Horimizu, Shizuoka (JP); Tadashi Mochizuki, Shizuoka (JP)

(73) Assignee: YASUI CORPORATION, Shizuoka (JP)

( * ) Notice: Subject to any disclaimer, the term of this patent is extended or adjusted under 35 U.S.C. 154(b) by 0 days.

(21) Appl. No.: 16/698,538

(22) Filed: Nov. 27, 2019

(65) Prior Publication Data
US 2020/0339397 A1 Oct. 29, 2020

(30) Foreign Application Priority Data
Apr. 25, 2019 (JP) .............................. JP2019-084388

(51) Int. Cl.
*B66F 7/06* (2006.01)
*B60S 5/00* (2006.01)

(52) U.S. Cl.
CPC .............. *B66F 7/0666* (2013.01); *B60S 5/00* (2013.01)

(58) Field of Classification Search
CPC ...... B66F 7/0666; B66F 7/065; B66F 7/0658; B66F 7/0675; B66F 7/0691; B60S 5/00
See application file for complete search history.

(56) References Cited

U.S. PATENT DOCUMENTS

| | | | | |
|---|---|---|---|---|
| 2,464,731 A * | 3/1949 | Thompson | ................ | B66F 7/18 187/205 |
| 4,447,042 A * | 5/1984 | Masui | ................... | B66F 7/0641 187/204 |
| 4,830,147 A * | 5/1989 | Kawada | ................ | B66F 7/0666 187/205 |
| 4,886,145 A * | 12/1989 | Iwahashi | ................... | B66F 7/08 254/89 R |
| 5,450,928 A * | 9/1995 | Isogai | ................... | B66F 7/0691 187/205 |
| 6,257,371 B1 * | 7/2001 | Wanner | ..................... | B66F 7/20 187/204 |
| 2003/0197110 A1 * | 10/2003 | Cui | ........................ | F16M 11/38 248/585 |
| 2012/0181735 A1 * | 7/2012 | Ooe | ....................... | B66F 7/0641 269/17 |
| 2016/0039646 A1 * | 2/2016 | Knapp | ...................... | B66F 3/46 254/89 R |
| 2016/0332853 A1 * | 11/2016 | Fijnvandraat | ............. | B66F 7/16 |

FOREIGN PATENT DOCUMENTS

| | | |
|---|---|---|
| JP | S62-218305 A | 9/1987 |
| JP | S63-139293 U | 9/1988 |

(Continued)

OTHER PUBLICATIONS

S647189—Machine Translation (Year: 1989).*
Decision to Grant issued in Japanese Application No. 2019-084388, dated Aug. 19, 2019 (5 pages).

*Primary Examiner* — Michael A Riegelman
(74) *Attorney, Agent, or Firm* — Osha Bergman Watanabe & Burton LLP

(57) ABSTRACT

In a vehicle lift device, an undulating link device of each of the raising/lowering devices has each link displaced along the left-right direction orthogonal to an approach direction of a vehicle, and keeps a vehicle support table in a horizontal state to be raised and lowered only in the vertical direction.

20 Claims, 27 Drawing Sheets

(56) References Cited

FOREIGN PATENT DOCUMENTS

| | | |
|---|---|---|
| JP | S64-007189 U | 1/1989 |
| JP | H06-135694 A | 5/1994 |
| JP | H09-077482 A | 3/1997 |
| JP | H10-330093 A | 12/1998 |
| JP | 2009256014 A | 11/2009 |
| JP | 2011-088697 A | 5/2011 |
| JP | 2012-001333 A | 1/2012 |
| JP | 2016-130150 A | 7/2016 |
| JP | 2017-001856 A | 1/2017 |
| JP | 2018-203382 A | 12/2018 |
| KR | 10-2016-0030778 A | 3/2016 |
| WO | 1999/012839 A1 | 3/1999 |

\* cited by examiner

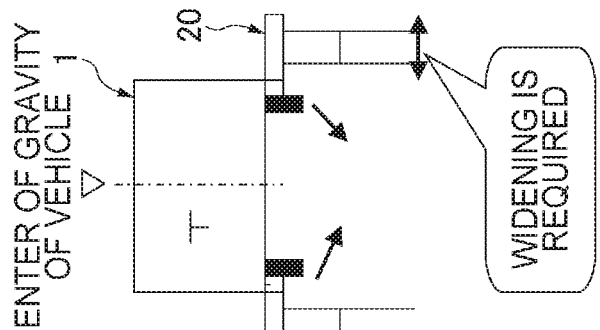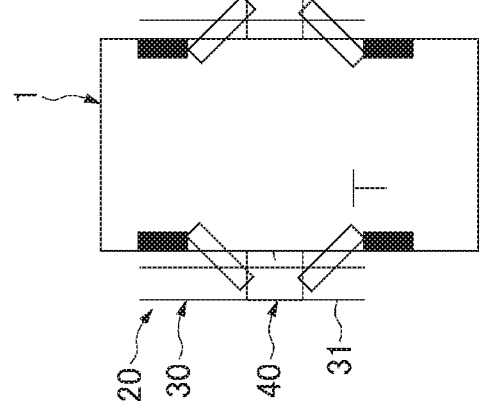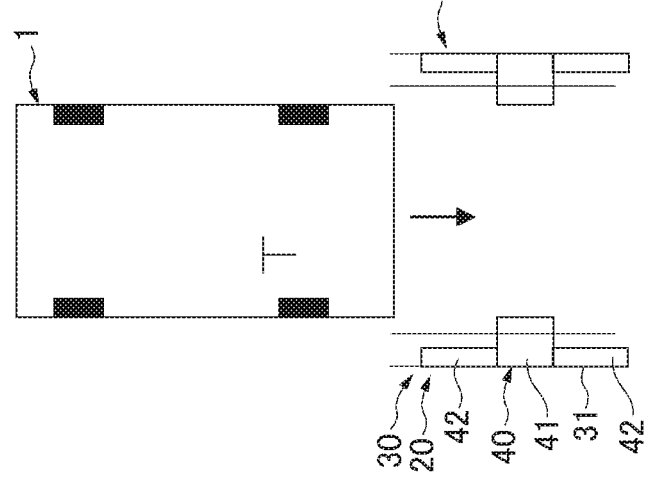

Prior Art

Prior Art

VEHICLE LIFT DEVICE

BACKGROUND

Technical Field

The present invention relates to a vehicle lift device.

Related Art

Conventionally, as described in Patent document 1, there is a vehicle lift device provided with a pair of left and right raising/lowering devices on both sides in a left-right direction orthogonal to an approach direction of a vehicle in a maintenance work area where the vehicle enters and stops at a maintenance site, each of the raising/lowering devices having an undulating link device constituted by a plurality of links and having a vehicle support table (for example, a lift table and a turning arm) that supports the vehicle mounted on the undulating link device.

In the vehicle lift device described in Patent document 1, in the undulating link device of each of the raising/lowering devices, each link is displaced along the vehicle approach direction (in other words, a vehicle longitudinal direction).
Patent document 1: JP 2018-203382 A

SUMMARY

The vehicle lift device described in Patent document 1 has the following problems.

(1) In the undulating link device of each of the raising/lowering devices, each link is displaced along the vehicle longitudinal direction. Therefore, it is necessary to arrange each undulating link device (30) on the outer side in the vehicle width direction with respect to a portion immediately below the vehicle as shown in FIGS. 19A to 19C in order to prevent each undulating link device from hindering a maintenance work space for an engine, a suspension system, a transmission, a battery, and the like located around a front wheel and a rear wheel along the vehicle longitudinal direction of a lift target vehicle.

Further, when each of the undulating link devices (30) is arranged on the outer side in the vehicle width direction with respect to the portion immediately below the vehicle, an undulation range of each link is likely to hinder maintenance work spaces W1 and W2 for the vehicle by reaching the maintenance work spaces W1 and W2 on the front wheel side and the rear wheel side along the vehicle longitudinal direction as shown in FIGS. 20B and 20C. Further, if a lift height of the vehicle becomes H2, which is lower than H1, the range that hinders the maintenance work spaces W1 and W2 increases.

(2) According to the above (1), as a result of arranging the undulating link device of each raising/lowering device on the outer side in the vehicle width direction with respect to the portion immediately below the vehicle, each undulating device lifts the vehicle while resisting vehicle weight on the outer side with respect to the portion immediately below the vehicle. Thus, a spring load acting on each link increases, the rigidity required for each link (for example, each width of link elements constituting each link) increases, and as a result, the overall size of the undulating link device increases. This means that an installation space for the undulating link device is increased in the maintenance work area so that it is difficult to secure a wide maintenance work space immediately below the lifted vehicle to improve the maintenance workability.

(3) In the undulating link device of each of the raising/lowering devices, each link is displaced along the vehicle longitudinal direction. Therefore, the respective undulating link devices are arranged to be line-symmetric with each other, and it is difficult to make the respective undulating link devices common with each other and to share the vehicle support table. Thus, it is difficult to reduce the number of components of each of the raising/lowering devices and the number of assembling steps, and it is difficult to improve the productivity of the vehicle lift device.

Further, each of the raising/lowering devices has directionality in the vehicle approach direction so that the vehicle approach direction with respect to the vehicle lift device is restricted to one direction.

An object of the invention is to secure a wide maintenance work space immediately below a lifted vehicle in a vehicle lift device to improve the maintenance workability and to enable improvement of the productivity.

According to the invention, there is provided a vehicle lift device including: a pair of left and right raising/lowering devices provided on both sides in a left-right direction orthogonal to an approach direction of a vehicle in a maintenance work area where the vehicle enters and stops at a maintenance site, each of the raising/lowering device having an undulating link device constituted by a plurality of links; and a vehicle support table that supports the vehicle and is mounted on a top of the undulating link device, in which each of the links of the undulating link device of each of the raising/lowering devices is displaced along the left-right direction orthogonal to the vehicle approach direction to perform an undulating operation so that the vehicle support table is raised and lowered only in a vertical direction while being kept in a horizontal state by the undulating operation.

According to the invention, the vehicle lift device further includes a pit provided in the maintenance work area defined on a floor of the maintenance site, in which the undulating link device of each of the raising/lowering devices has at least two links including a first link, which is pivotally supported by a rotating support portion, arranged near one side of the pit along the left-right direction orthogonal to the vehicle approach direction inside the pit, and a second link which is slidably supported by a sliding support portion arranged over the one side to another side of the pit along the left-right direction orthogonal to the vehicle approach direction inside the pit.

According to the invention, the vehicle device further includes a movable plate that is provided at a pit closing position to close a central part of an opening sandwiched between the raising/lowering devices on both sides when the vehicle support table of each of the raising/lowering devices is raised from the opening of the pit, and is provided at an in-pit housing position to be housed inside the pit when the vehicle support table is lowered to a lift-down position.

According to the invention, when the vehicle support table of each of the raising/lowering devices is positioned at a lift-up position and an intersection of the first and second links is arranged to be higher than each of existing front and rear work floors, a triangular inter-link gap, formed immediately below the intersection and above the work floor by being sandwiched between lower edges of the first and second links below the intersection, faces each of the front and rear work floors.

According to the invention, each of the links constituting the undulating link device of each of the raising/lowering devices is configured using an assembly of two link members that form a pair, and each of two link elements constituting each of the link in the raising/lowering device on a left side and each of two link elements constituting each of the links in the raising/lowering device on a right side are arranged in an overlapping manner to be different from each other in the vehicle approach direction.

According to the invention, each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

According to the invention, each of the raising/lowering devices pivotally supports a lower end of the first link by the rotating support portion provided on a rack inside the pit, slidably supports a lower end of the second link, which has a length twice a length of the first link, by the sliding support portion provided on the rack inside the pit, pivotally attaches an upper end of the first link to an intermediate link together with a midpoint of the second link, pivotally attaches an upper end of the second link to the vehicle support table, pivotally attaches both ends of a first sub-link, which has an identical length to the first link, to the rack and the intermediate link to form a parallelogram link mechanism by four sections of the first link, the first sub-link, the rack, and the intermediate link, and pivotally attaches both ends of a second sub-link, which has a length half the length of the second link, to the vehicle support table and the intermediate link to form a parallelogram link mechanism by four sections of the second link, the second sub-link, the vehicle support table, and the intermediate link, and the movable pit cover is attached to the second sub-link.

(a) The undulating link device of each of the raising/lowering devices has each link displaced along the left-right direction orthogonal to the approach direction of the vehicle, and keeps the vehicle support table in the horizontal state to be raised and lowered only in the vertical direction. As a result, the vehicle can be lifted while stably supporting left and right lift points (or left and right tires) of the vehicle on the vehicle support table without being pulled in the opposite direction of the left and right.

(b) In the undulating link device of each of the raising/lowering devices, each link is displaced along the left-right direction orthogonal to the vehicle approach direction. As a result, it is possible to achieve mitigation of a bending load acting on each link and to reduce rigidity required for each link (for example, a width of the link element constituting each link) since each of the undulating link devices lifts the vehicle while resisting vehicle weight in a wide range from the outer side to the inner side along the vehicle width direction immediately below the lift target vehicle in the maintenance work area. As a result, the overall size of the undulating link device can be made compact. This means that it is possible to reduce an installation space for the undulating link device in the maintenance work area and to secure a wide maintenance work space immediately below the lifted vehicle to improve the maintenance workability.

(c) In the undulating link device of each of the raising/lowering devices, each link is displaced along the left-right direction orthogonal to the vehicle approach direction. As a result, each undulating link device is arranged only in a portion immediately below the central portion sandwiched between a front wheel side and a rear wheel side along the vehicle longitudinal direction of the lift target vehicle to move up and down, and thus, it is possible to secure a wide maintenance work space on the front wheel side and the rear wheel side immediately below the vehicle. Moreover, this maintenance work space is constant without being affected by a lift height of the vehicle. Therefore, it is possible to improve the maintenance workability of an engine, a suspension system, a transmission, a battery, and the like located on the front wheel side and the rear wheel side of the vehicle.

(d) In the undulating link device of each of the raising/lowering devices, each link is displaced along the left-right direction orthogonal to the vehicle approach direction. Therefore, the respective undulating link devices can be arranged to be point-symmetrical with each other and can be common with each other, and the vehicle support table can be shared with each other, and thus, the number of components of each of the raising/lowering devices is reduced, and the number of assembling steps can be reduced so that the productivity of the vehicle lift device can be improved.

Each of the raising/lowering devices has no directionality in the vehicle approach direction, and it is possible to perform maintenance work even if the vehicle approaches from either of two directions along the vehicle approach direction.

(e) The undulating link device of each of the raising/lowering devices has the first link pivotally supported by the rotating support portion near one side along the left-right direction of the pit, and the second link slidably supported by the sliding support portion near the other side along the left-right direction of the pit. Therefore, each undulating link device lifts the vehicle while stably resisting vehicle weight in the wide range along the vehicle width direction immediately below the lift target vehicle with the two links, that is, the first link moving up and down near the outer side along the vehicle width direction immediately below the lift target vehicle in the maintenance work area and the second link moving up and down near the inner side, thereby stably realizing the above (b).

(f) Each of the raising/lowering devices can form the work floor closed by the movable plate at the central part of the opening sandwiched between the raising/lowering devices on both sides when the vehicle support table is raised from the opening of the pit. The worker can perform the maintenance work on a wide work floor formed by the existing work floors on the front and rear of the pit and the work floor formed by the movable plate at the center.

(g) When the vehicle support table of each of the raising/lowering devices is positioned at the lift-up position and an intersection of the first and second links is arranged to be higher than each of existing front and rear work floors, the triangular inter-link gap, which is formed immediately below the intersection and on the upper side of the work floor by being sandwiched by lower edges of the first and second links below the intersection, faces each of the front and rear work floors. When the raising/lowering device is lowered so that this triangular inter-link gap is displaced to be reduced, the worker does not exist below the descending vehicle, and it is possible to eliminate the risk that a foot is pinched in the inter-link gap that is displaced to be reduced.

(h) Each of the links constituting the undulating link device of each of the raising/lowering devices is configured using the assembly of two link members that form a pair, and each of two link elements constituting each of the link in the raising/lowering device on the left side and each of two link elements constituting each of the links in the raising/lowering device on the right side are arranged in an overlapping manner to be different from each other in the vehicle approach direction. Therefore, the area occupied by both the raising/lowering devices in the maintenance site can be reduced. As a result, an earthwork area of the maintenance site can be reduced, and the area of the pit can also be reduced.

(i) Each of the raising/lowering devices has each movable pit cover that is attached to a constituent link of the undulating link device to be capable of accompanying the undulating link device, and when the vehicle support table is positioned at the lift-down position, the movable pit cover of each of the raising/lowering devices closes a part of the opening of the pit which is not closed by the vehicle support table in the opening of the pit. At this time, the movable pit cover closes substantially the entire pit opening together with the vehicle support table, and it is possible to allow the vehicle to enter the maintenance work area by forming a pedestrian surface for the worker and forming an approach road surface for a maintenance target vehicle.

Further, a wide maintenance work space that is not hindered by the movable pit cover is secured immediately below the lift target vehicle during maintenance work in which the movable pit cover is separated upward from a part of the opening of the pit during the process of raising the vehicle support table from the lift-down position and the vehicle support table is raised to the lift-up position.

(j) When each of the raising/lowering devices pivotally supports the lower end of the first link by the rotating support portion provided on the rack inside the pit, slidably supports the lower end of the second link, which has the length twice the length of the first link, by the sliding support portion provided on the rack inside the pit, pivotally attaches the upper end of the first link to the intermediate link together with the midpoint of the second link, pivotally attaches the upper end of the second link to the vehicle support table, pivotally attaches both ends of the first sub-link, which has the identical length to the first link, to the rack and the intermediate link to form the parallelogram link mechanism by four sections of the first link, the first sub-link, the rack, and the intermediate link, and pivotally attaches both ends of the second sub-link, which has the length half the length of the second link, to the vehicle support table and the intermediate link to form the parallelogram link mechanism by four sections of the second link, the second sub-link, the vehicle support table, and the intermediate link, the vehicle support table can be raised and lowered only in the vertical direction while being kept in the horizontal state as described above (a). Further, the movable pit cover of the above (i) can be attached to the second sub-link.

BRIEF DESCRIPTION OF DRAWINGS

FIG. 5A is a front view showing a lift-up state, FIG. 5B is a front view showing a lift intermediate state, and FIG. 5C is a front view showing a lift initial stage state;

FIG. 6A is a schematic view showing the lift-up state, FIG. 6B is a schematic view showing the lift intermediate state, and FIG. 6C is a schematic view showing the lift initial stage state;

FIG. 7A is a plan view, FIG. 7B is a front view, and FIG. 7C is a side view;

FIG. 18A is a schematic plan view showing a vehicle approach process, FIG. 18B is a schematic front view showing a lift-up state, and FIG. 18C is a schematic front view showing a lift intermediate state;

FIGS. 19A to 19C show a configuration of each raising/lowering device in a conventional vehicle lift device, FIG. 19A is a schematic plan view showing a vehicle approach process, FIG. 19B is a schematic plan view showing a vehicle approach stop state, and FIG. 19C is a schematic front view showing a lift-up state;

FIG. 20A is a side view showing a lift-up state according to an example of the invention, FIG. 20B is a side view showing a lift-up state of a conventional example, and FIG. 20C is a side view showing a lift intermediate state of the conventional example;

FIG. 21A is a schematic plan view showing a pit of an example of the invention, FIG. 21B is a schematic plan view showing a pit of a conventional example, and FIG. 21C is a schematic plan view showing a pit of another conventional example;

FIG. 24A is a schematic view showing a lift-up state, and FIG. 24B is a schematic view showing a lift intermediate state;

FIG. 25A is a schematic view showing a lift-up state, and FIG. 25B is a schematic view showing a lift intermediate state;

FIG. 26A is a perspective view showing a lift-up state, FIG. 26B is a perspective view showing a lift initial stage state, and FIG. 26C is a perspective view showing a lift-down state; FIG. 27A is a perspective view showing a lift-up state, FIG. 27B is a perspective view showing a lift initial stage state, and FIG. 27C is a perspective view showing a lift-down state.

DETAILED DESCRIPTION

Figure 1:
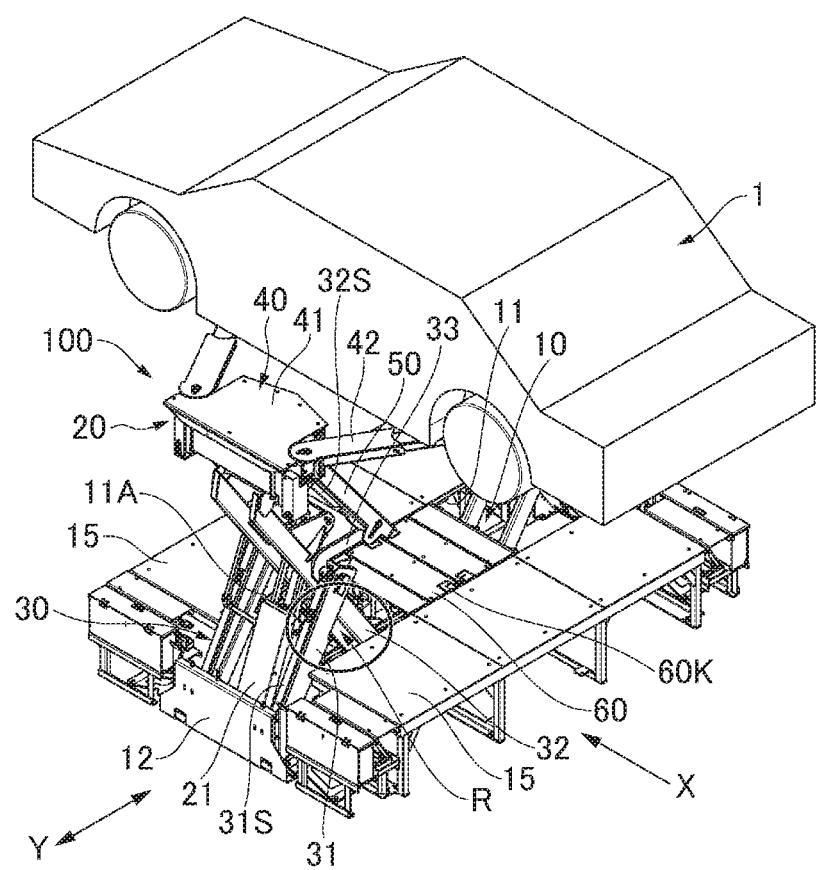
FIG. 1 is a perspective view showing a vehicle lift device according to an embodiment of the invention.

A vehicle lift device 100 is provided with a pair of left and right raising/lowering devices 20 on both sides in a left-right direction Y (vehicle width direction) (FIGS. 1, 12 to 17) orthogonal to an approach direction X (vehicle longitudinal direction) of a vehicle 1 (FIGS. 1, 12 to 17 in a maintenance work area where the vehicle 1 approaches and stops at a maintenance site as shown in FIGS. 1 to 4.

In the embodiment, a pit 10 (FIG. 2) is recessed in the maintenance work area defined on the floor of the maintenance site, and the pair of raising/lowering devices 20 are housed inside the pit 10.

Each of the raising/lowering devices 20 has an undulating link device 30 constituted by a plurality of links, and has a vehicle support table 40 (a lift table 41 and front and rear turning arms 42 and 42) which supports the vehicle and is mounted on the top of the undulating link device 30. Specifically, each of the vehicle support tables 40 has the lift table 41 provided on the top of the undulating link device 30, and has the front and rear turning arms 42, which enable lifting of a lower surface of the vehicle 1 that has entered the vehicle maintenance work area and stopped, at both front and rear ends of the lift table 41 to be capable of turning.

Each of the raising/lowering devices 20 enables the undulating link device 30 and the vehicle support table 40 to move inside and outside the pit 10 through an opening 11 of the pit 10 provided at the same level as the floor of the maintenance site by the operation of a raising/lowering actuator (raising/lowering cylinder device in the embodiment) 21. The undulating link device 30 of each of the raising/lowering devices 20 performs an undulating operation to be capable of ascending and descending between a lift-down position where the vehicle support table 40 is positioned at each of left and right main opening portions 11A (FIG. 1), a part of the opening 11 of the pit 10, to close the main opening portion 11A and a lift-up position where the vehicle support table 40 is positioned above the pit 10.

Here, in the undulating link device 30 of each of the raising/lowering devices 20, each link is displaced along the left-right direction Y orthogonal to the approach direction X of the vehicle 1. Further, the undulating link device 30 of each of the raising/lowering devices 20 keeps the vehicle support table 40 in a horizontal state to be raised and lowered only in the vertical direction.

The undulating link device 30 of each of the raising/lowering devices 20 has at least two links including a first link 31, which is pivotally supported by a rotating support portion 13, arranged near one side (near the outer side) of the pit 10 along the left-right direction Y orthogonal to the approach direction X of the vehicle 1 on a rack 12 inside the pit 10, and a second link 32 which is slidably supported by a sliding (or rolling) support portion 14 arranged along the one side (outer side) to the other side (inner side) of the pit 10 along the left-right direction orthogonal to the approach direction X of the vehicle 1 on the rack 12 inside the pit 10.

In the embodiment, each of the raising/lowering devices 20 pivotally supports a lower end a of the first link 31 by the rotating support portion 13 provided on the rack 12 inside the pit 10, slidably supports a lower end a of the second link 32 having a length of 2×L1, which is twice a length L1 of the first link 31, by the sliding support portion 14 provided on the rack 12 inside the pit 10, pivotally attaches an upper end b of the first link 31 to an intermediate link 33 together with a midpoint (the center of the length of the second link 32) c of the second link 32, and pivotally attaches an upper end b of the second link 32 to the vehicle support table 40 (lift table 41) as shown in FIGS. 5A to 6C. Further, each of the raising/lowering devices 20 pivotally attaches both ends a and b of a first sub-link 31S having the same length as the first link 31 to the rack 12 and the intermediate link 33 to form a parallelogram link mechanism 20A by four sections of the first link 31, the first sub-link 31S, the rack 12, and the intermediate link 33. Further, each of the raising/lowering devices 20 pivotally attaches both ends a and b of a second sub-link 32S, which has a length half the length of the second link 32, to the vehicle support table 40 (lift table 41) and the intermediate link 33 to form a parallelogram link mechanism 20B by four sections of the second link 32, the second sub-link 32S, the vehicle support table 40 (lift table 41), and the intermediate link 33. Each of the raising/lowering devices 20 attaches a movable pit cover 50, which will be described later, to the second sub-link 32S.

Each of the raising/lowering devices 20 pivotally attaches a cylinder proximal end of the raising/lowering cylinder device constituting the raising/lowering actuator 21 to the rack 12, and pivotally supports a distal end of a piston rod of the raising/lowering cylinder device by an intermediate portion of the second link 32.

Figure 21A:
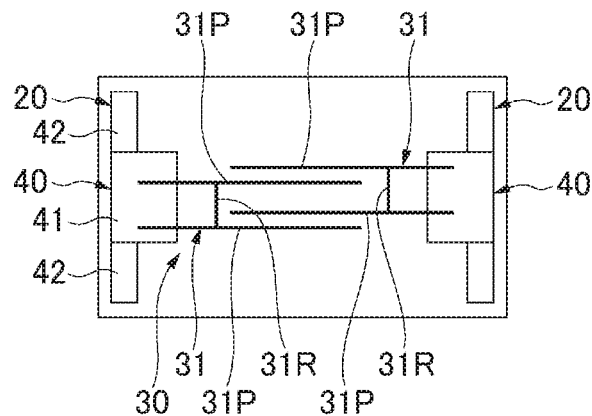
FIGS. 21A to 21C show a pit of a vehicle lift device.

In each of the raising/lowering devices 20, each of the links 31, 32, 31S, 32S, and 33 constituting the undulating link device 30 is configured using an assembly, obtained by connecting two link elements (link plates or link bars) (regarding the first link 31, a set of two link plates 31P and 31P shown in FIG. 21A) using a connecting member (regarding the first link 31, a connecting member 31R shown in FIG. 21A), and each of the two link elements constituting each link in the raising/lowering device 20 on the left side, and each of the two link elements constituting each link in the raising/lowering device 20 on the right side are arranged in an overlapping manner to be different from each other in the approach direction X of the vehicle 1 as shown in FIGS. 1 and 21A to 21C.

Figure 5A:
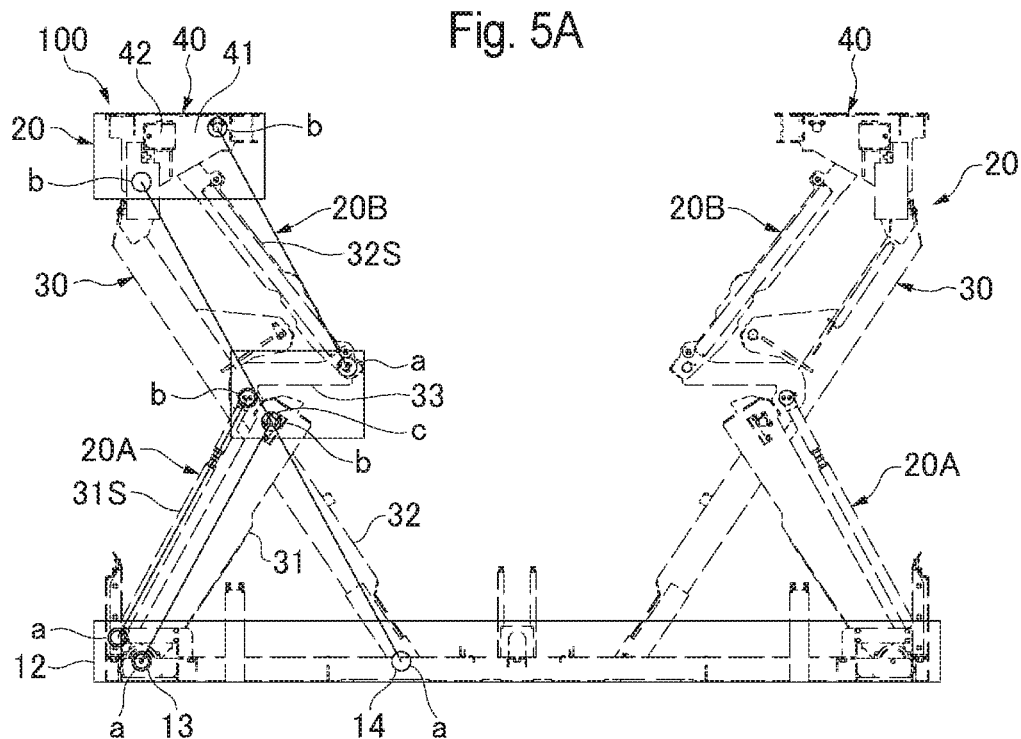
FIGS. 5A to 5C show changes of a lift state in an undulating link device.
Figure 5B:
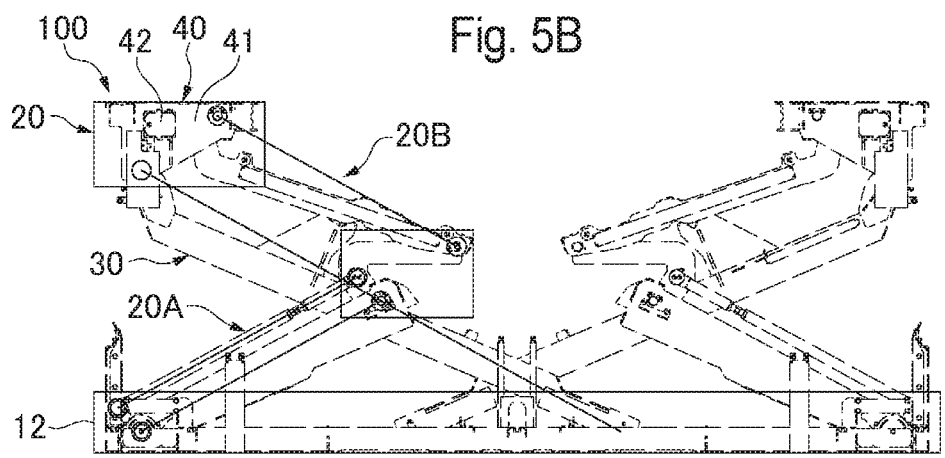
Figure 5C:
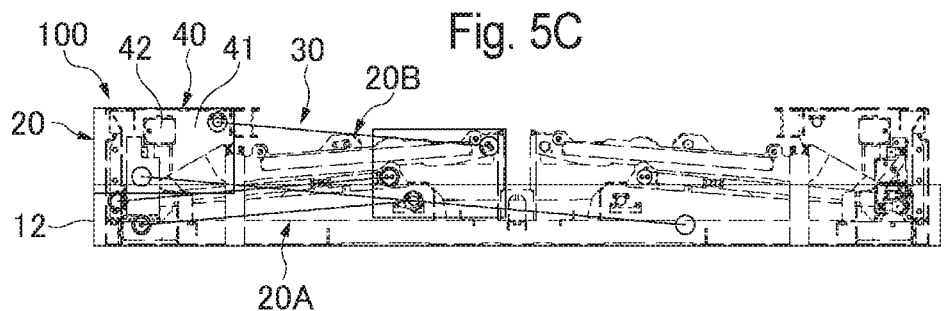

In the vehicle lift device 100, on both front and rear sides of the pit 10 in the approach direction X of the vehicle 1, front and rear fixed pit cover 15 are provided to be flush with the floor of the maintenance site (instead of providing the respective fixed pit covers 15, the floor of the maintenance site may be extended to both the front and rear sides of the pit 10). As a result, each of the raising/lowering devices 20 can move the undulating link device 30 and the vehicle support table 40 (the lift table 41 and the turning arm 42) inside and outside the pit 10 through the opening 11 (the left and right main opening portions 11A and a sub-opening portion 11B at the center) sandwiched between the front and rear fixed pit covers 15 in the pit 10 by the operation of the raising/lowering actuator 21, and can ascend and descend between a lift-down position (FIGS. 5C and 6C) where the vehicle support table 40 is positioned at the opening 11 of the pit 10 to close the opening 11 and to be flush with the front and rear fixed pit covers 15 and a lift-up position (FIGS. 5A and 6A) where the vehicle support table 40 is positioned above the pit 10. FIGS. 5B and 6B show a lift intermediate state.

At this time, each of the raising/lowering devices 20 has the two parallelogram link mechanisms 20A and 20B described above, each length of the first link 31, the first sub-link 31S, and the second sub-link 32S is set to L1 and the length of the second link 32 is set to 2×L1. Thus, the vehicle support table 40 (the lift table 41 and the turning arm 42) can be kept in the horizontal state to be raised and lowered only in the vertical direction along the same vertical line V (FIG. 6) as described above.

Figure 12:
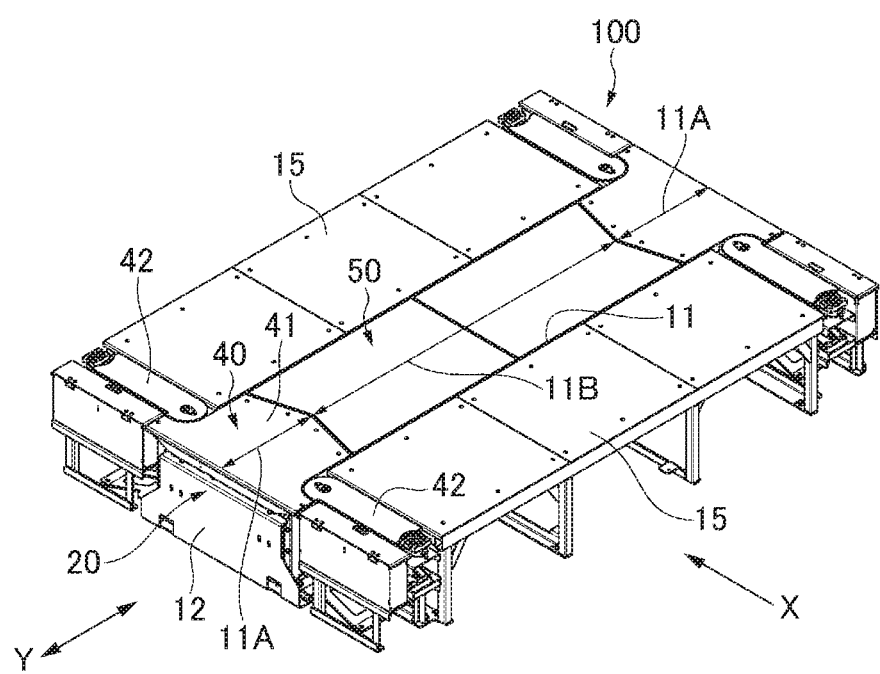
FIG. 12 is a perspective view showing a lift-down state in which each raising/lowering device of the vehicle lift device is positioned in a lift standby stage.

Each of the raising/lowering devices 20 has a movable pit cover 50 that is attached to a constituent link of the undulating link device 30 to be capable of accompanying the undulating operation of the undulating link device 30. When each of the vehicle support tables 40 is positioned at a pit down position and closes the main opening portion 11A which is a part of the opening 11 of the pit 10, each of the movable pit covers 50 of the raising/lowering devices 20 closes each half of two left and right halves of the entire sub-opening portion 11B which is the other part (central part sandwiched by the left and right main opening portions 11A) of the opening 11 of the pit 10 that is not closed by the vehicle support table 40 (FIG. 12). Further, the movable pit covers 50 of the respective raising/lowering devices 20 open the above-described respective halves of the sub-opening portion 11B of the pit 10 such that each of the undulating link devices 30 can be moved outside of the pit 10 from each half of the sub-opening portion 11B and the main opening portion 11A and separated upward during a process in which each of the vehicle support tables 40 is raised from the lift-down position.

Here, when the vehicle support table 40 of each of the raising/lowering devices 20 is positioned at the lift-up position in the vehicle lift device 100, the movable pit cover 50 of each of the raising/lowering devices 20 is configured to be separated upward from the opening level of the pit 10.

Figure 7A:
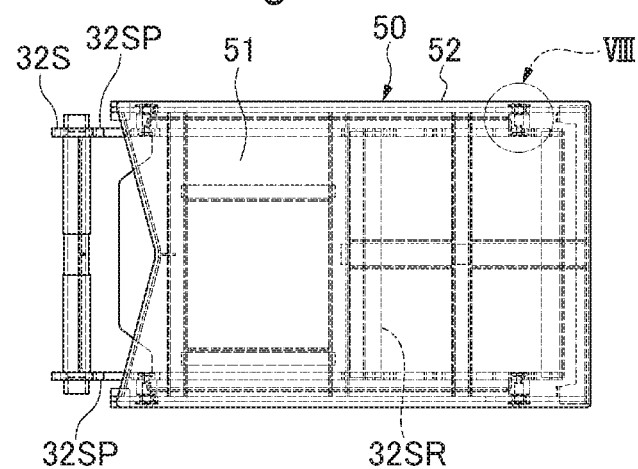
FIGS. 7A to 7C show a movable pit cover attached to the constituent link of the undulating link device.
Figure 7B:
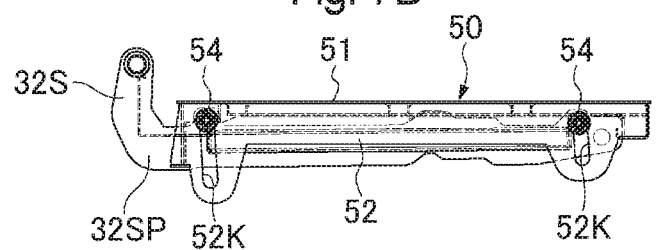
Figure 7C:
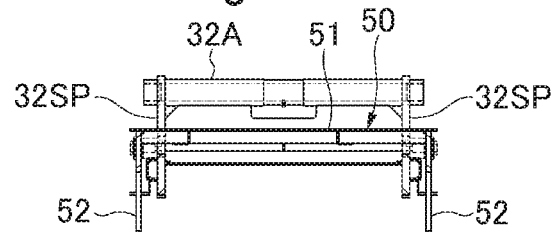
Figure 8:
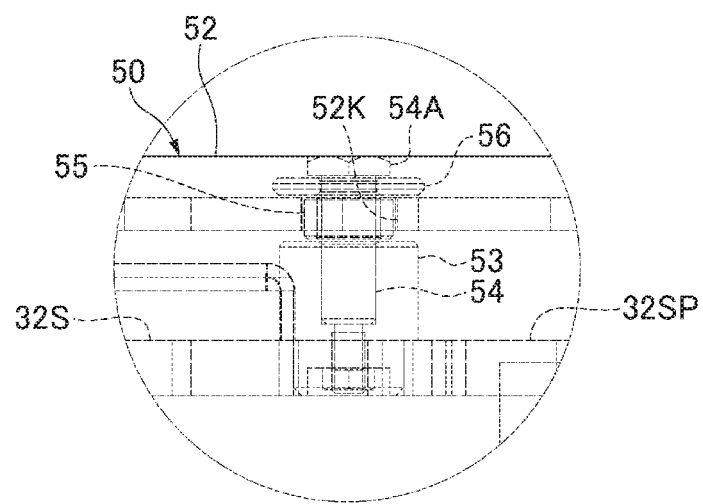
FIG. 8 is an enlarged plan view showing a portion VIII in FIG. 7A.

In each of the raising/lowering devices 20, each of the movable pit covers 50 has side plates 52 fixedly provided at lower portions of the front and rear sides of a flat cover plate 51 as shown in FIGS. 7A to 8, and is covered to be relatively movable from above so as to be substantially parallel to two link plates 32SP of an assembly constituted by the two link plates 32SP forming the second sub-link 32S of each of the raising/lowering devices 20 and a connecting member 32SR. In each of the movable pit covers 50, slotted holes 52K provided in the left and right side plates 52 are slidably engaged with a guide roller 55 pivotally supported by one guide bolt 54 on each of the left and right sides implanted in a boss 53 provided on each of the front and rear link plates 32SP. A guide washer 56 interposed between a head 54A of the guide bolt 54 and the guide roller 55 is denoted by reference sign 56. The slotted hole 52K of the side plate 52 extends in a direction substantially orthogonal to a plate surface of the cover plate 51. As a result, the movable pit cover 50 is attached to the second sub-link 32 of the undulating link device 30 via the slotted hole 52K, and is relatively movable with respect to the second sub-link 32S in a slotted hole range of the slotted hole 52K.

Figure 13:
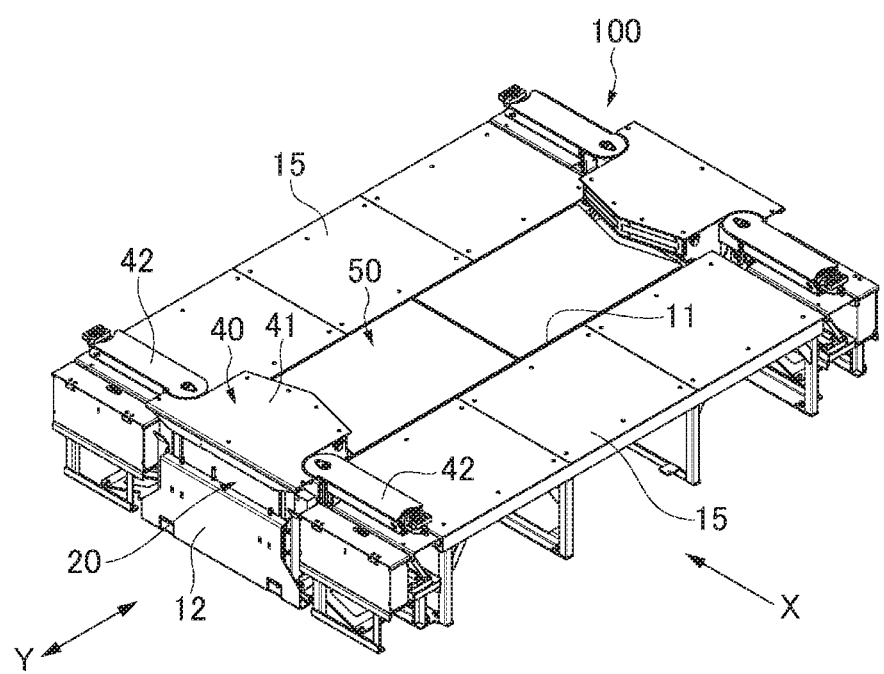
FIG. 13 is a perspective view showing a lift initial state in which each raising/lowering device of the vehicle lift device is positioned at a lift initial stage.

As each of the movable pit covers 50 is attached to the guide roller 55 provided on the second sub-link 32S of the undulating link device 30 via the above-described slotted hole 52K, the movable pit cover 50 does not immediately accompany the undulating operation of the undulating link device 30, but accompanies the operation with a delay as follows. That is, the movable pit cover 50 is kept at the opening level of the pit 10 without being caused to accompany the undulating operation of the undulating link device 30 between a lift standby stage in which each of the raising/lowering devices 20 positions the vehicle support table 40 at the lift-down position (FIG. 12) and a lift initial stage in which the vehicle support table 40 starts to be raised from the lift-down position and the turning arm 42 is capable of turning relative to the lower surface of the vehicle 1 at a level above the opening 11 of the pit 10 (FIG. 13). Then, in a stage where each of the raising/lowering devices 20 raises the vehicle support table 40 from the lift initial stage, the movable pit cover 50 is attached to the second sub-link 32S of the undulating link device 30 via the slotted hole 52K such that the movable pit cover 50 accompanies the undulating operation of the undulating link device 30 with a certain amount of delay corresponding to the slotted hole range of the slotted hole 52K.

Figure 9:
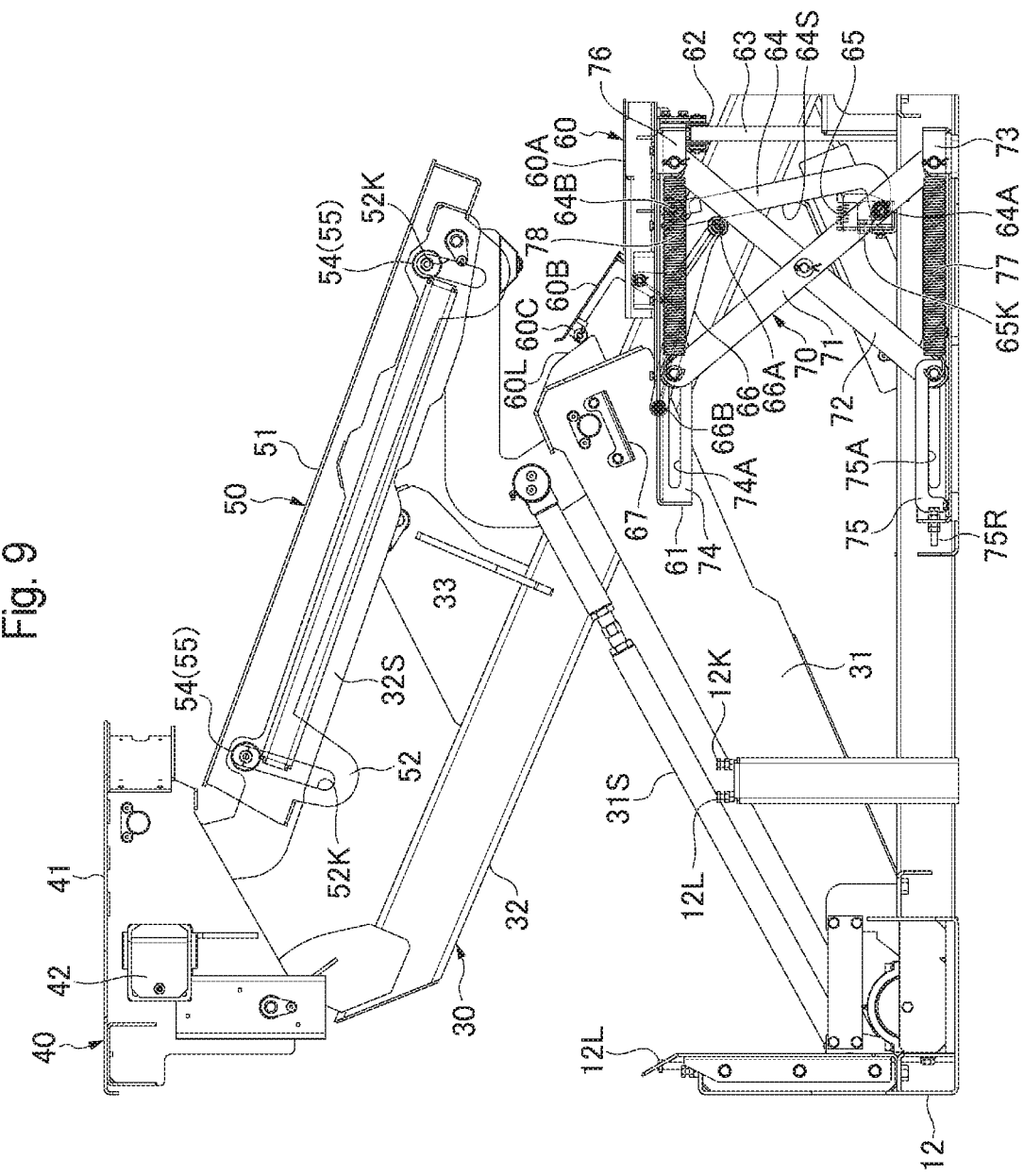
FIG. 9 is a front view showing a movable plate set at a pit closing position.
Figure 10:
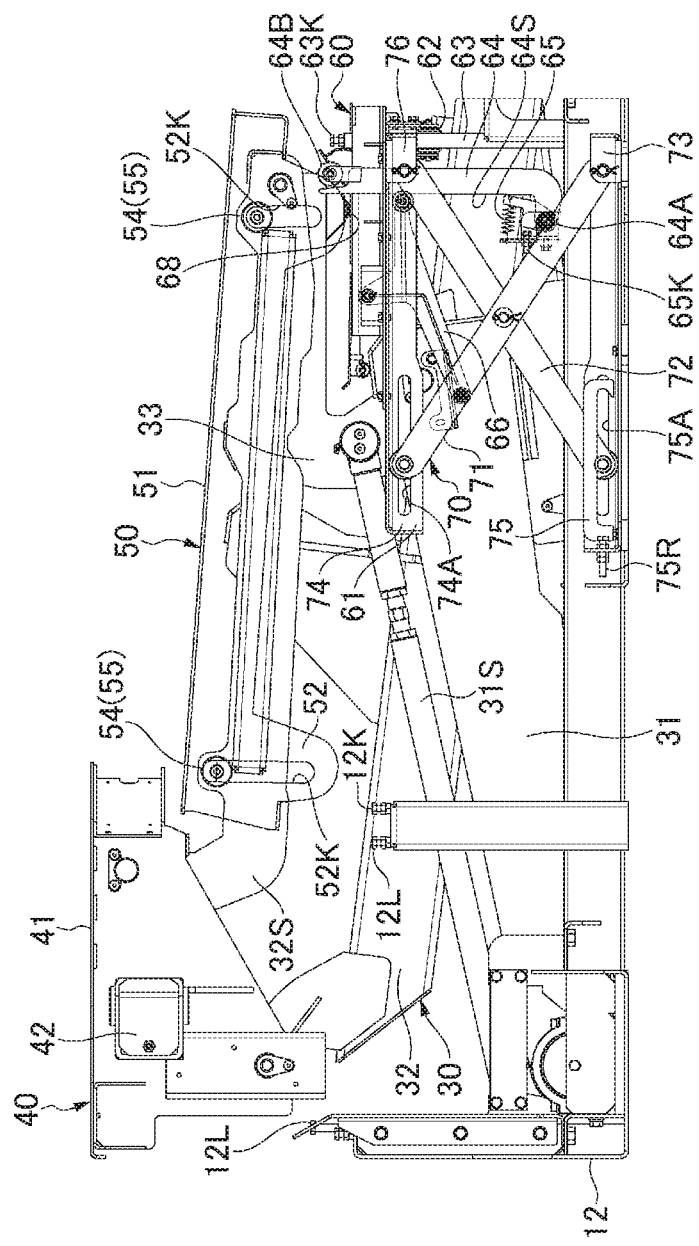
FIG. 10 is a front view showing the movable plate set at an intermediate position.
Figure 11:
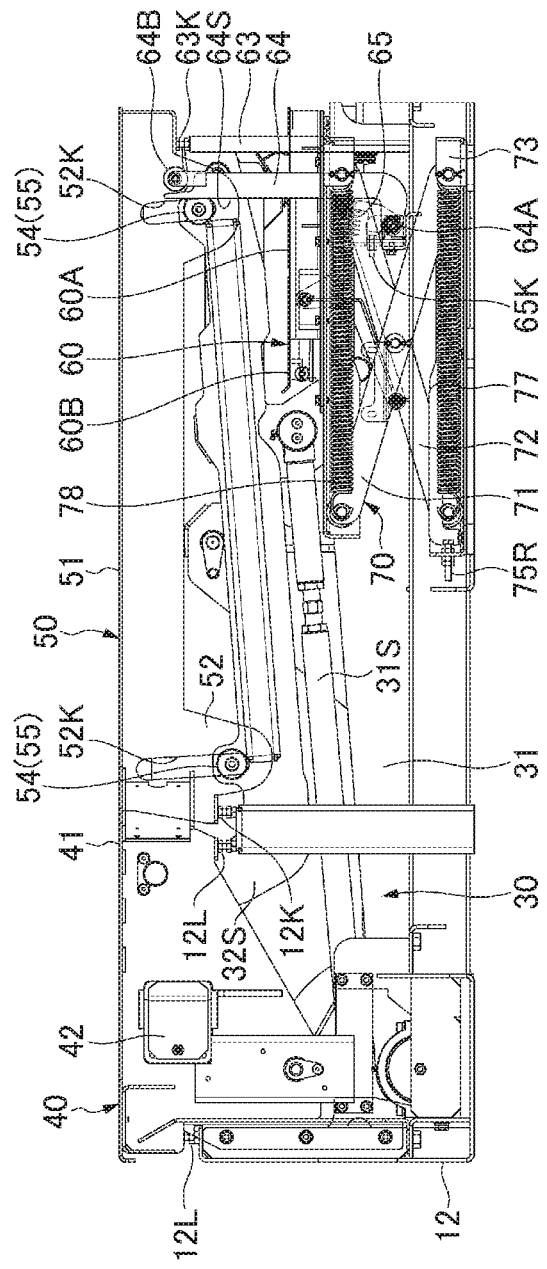
FIG. 11 is a front view showing the movable plate set at an in-pit housing position.

Specifically, each of the raising/lowering devices 20 operates the vehicle support table 40 and the movable pit cover 50 as follows by the undulating operation of the undulating link device 30 (FIGS. 9 to 11).

(1) When the raising/lowering actuator 21 of each of the raising/lowering devices 20 moves up the undulating link device 30 on the lift-up side to lift the lift table 41 of the vehicle support table 40, lifts the lift-up position that exceeds, for example, 150 mm from the lift-down position, and positions the turning arm 42 at an upper level exceeding 150 mm above the opening 11 of the pit 10 (each upper surface level of the front and rear fixed pit covers 15), the movable pit cover 50 attached to the guide roller 55 provided on the second sub-link 32S of the undulating link device 30 via the slotted hole 52K is supported by the second sub-link 32S such that an upper end of the slotted hole 52K is deposited on the guide roller 55 by its own weight of the movable pit cover 50, and is lifted toward the lift-up position accompanying the movement of the second sub-link 32S based on the undulating operation of the undulating link device 30 as shown in FIGS. 9 and 10.

(2) When the raising/lowering actuator 21 of each of the raising/lowering devices 20 causes the undulating link device 30 to be prone from the above (1) and positioned the vehicle support table 40 at the lift initial stage, which is 150 mm above the lift-down position, the movable pit cover 50 abuts on a stopper 12K such as a bolt provided in a rising portion of the rack 12 and a stopper 63K provided in a raising/lowering guide 63 for a movable plate 60 to be described later, and retains an upper surface of the cover plate 51 at the opening level of the pit 10, in other words, a floor position that is flush with the upper surfaces of the front and rear fixed pit covers 15 as shown in FIGS. 11 to 14. As a result, the movable pit cover 50 forms, together with the front and rear fixed pit covers 15, a pedestrian surface for a worker and an approach road surface for a maintenance target vehicle.

Figure 14:
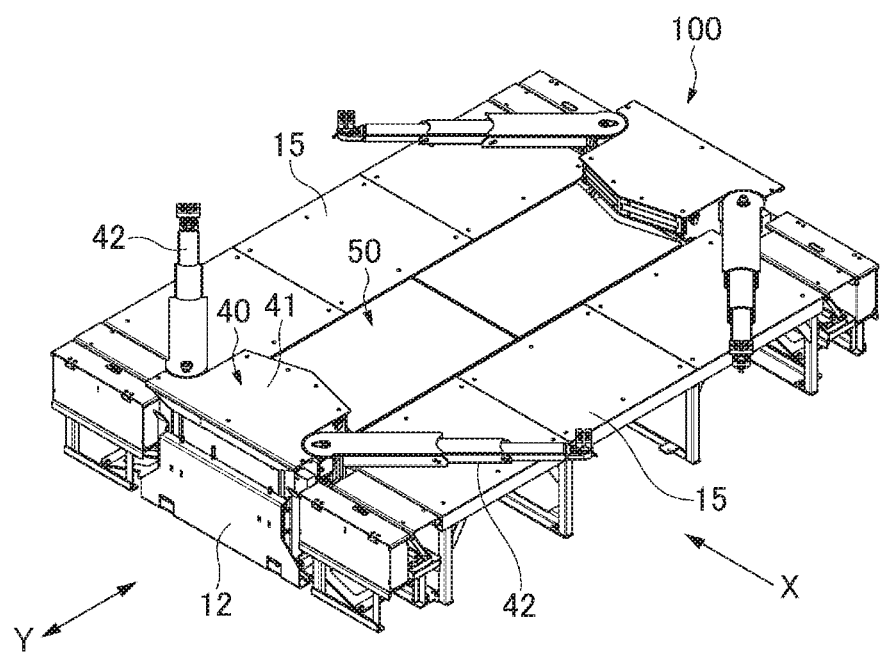
FIG. 14 is a perspective view showing a turning state of a turning arm in each raising/lowering device of the vehicle lift device.

At this time, the undulating link device 30 positions the vehicle support table 40 at the lift initial stage as described above, and sets the turning arm 42 provided in the lift table 41 to the upper level, which is 150 mm above the opening 11 of the pit 10, and enables this turning arm 42 to turn with respect to the lower surface of the lift target vehicle as shown in FIGS. 13 and 14.

(3) When the raising/lowering actuator 21 of each of the raising/lowering devices 20 causes the undulating link device 30 to be more prone than the above (2), the guide roller 55 provided on the second sub-link 32S of the undulating link device 30 moves downward in the slotted hole 52K of the movable pit cover 50 retained at the floor position described in the above (2), and the vehicle support table 40 is set to the lift standby stage to be positioned at the lift-down position as shown in FIGS. 11 and 12. At this time, the lift table 41 of the vehicle support table 40 is retained to be placed on a stopper 12L, such as a bolt, provided at the rising portion of the rack 12.

When the raising/lowering actuator 21 erects the undulating link device 30 from the lift-down state of the above (3) toward the lift-up side of the above (1) in each of the raising/lowering devices 20, the vehicle support table 40 and the movable pit cover 50 are displaced toward the lift-up position through the lift standby stage to the lift initial stage in the reverse procedure of the above (1) to (3).

Each of the raising/lowering devices 20 has the movable plate 60 attached thereto. In the embodiment, each one movable plate 60 corresponding to each of the left and right raising/lowering devices 20 forming a pair is provided. Meanwhile, the single movable plate 60 that is common to the respective raising/lowering devices 20 may be provided.

When the movable pit cover 50 of each of the raising/lowering devices 20 is separated upward from the sub-opening portion 11B of the pit 10, the movable plate 60 blocks at least a part of the sub-opening portion 11B (in the embodiment, each half of the sub-opening portion 11B corresponding to both the movable pit covers 50 to be positioned at a pit closing position that is flush with the front and rear fixed pit covers 15, and forms a work floor on the sub-opening portion 11B. The movable plate 60 is positioned at an in-pit housing position to be housed in the pit 10 when the movable pit cover 50 closes the sub-opening portion 11B of the pit 10.

The movable plate 60 is configured as follows in the embodiment.

That is, the movable plate 60 is mounted on an X link device 70 provided inside the pit 10, and is raised and lowered between the above-described pit closing position (FIG. 9) and the in-pit housing position (FIG. 11) as a raising/lowering guide roller 62 fixed to a raising/lowering frame 61 of the movable plate 60 is guided by a raising/lowering guide 63 erected on the rack 12.

The X link device 70 has an X shape in which midpoints of the two links 71 and 72 are pin-coupled, a lower end of the link 71 is pivotally attached to a rotating support portion 73 provided on the rack 12, an upper end of the link 71 is slidably supported by a slotted hole 74A of a sliding (or rolling) support portion 74 provided on the raising/lowering frame 61, a lower end of the link 72 is slidably supported by a slotted hole 75A of a sliding (or rolling) support portion 75 provided on the rack 12, and an upper end of the link 72 is attracted to a rotating support portion 76 provided on the raising/lowering frame 61. A tension spring 77 (not shown in FIG. 10) is stretched between the lower ends of the link 71 and the link 72, and a tension spring 78 (not shown in FIG. 10) is stretched between the upper ends of the link 71 and the link 72, thereby constantly applying spring forces to the X link device 70 in an extending direction. The movable plate 60 is constantly biased in a rising direction by spring forces of the tension springs 77 and 78 acting in the extending direction of the X link device 70, and one end of the slotted hole 75A in the sliding support portion 75 provided in the rack 12 stops a sliding end of the lower end of the link 72 in the extending direction of the X link device 70. As the sliding end of the link 72 is adjusted by an adjuster portion 75R of the sliding support portion 75, the X link device 70 is positioned at the pit closing position with a rising end regulated.

An L-shaped lock arm 64 is pivotally supported by a pivot 64A provided on the rack 12, and an upper end 64B of the lock arm 64 is provided with a roller 64B that abuts on the lower surface of the movable plate 60 at the pit closing position. The lock arm 64 is swingable between a lock position where the roller 64B slightly bites one side from a vertical line passing through the pivot 64A and an unlock position where the roller 64B is separated on the other side from the vertical line passing through the pivot 64B.

The lock arm 64 is constantly biased in a swinging direction toward the lock position by a tension spring 65 stretched between the lock arm 64 and the rack 12, and is positioned at the lock position with a swing limit restricted by a stopper bolt 65K that is provided on the rack 12 while enabling position adjustment. At this time, the lock arm 64 sustains and supports the lower surface of the movable plate 60 at the lock position with the roller 64B, and holds the movable plate 60 at the pit closing position.

The lock arm 64 is provided with an attached release arm 66 that switches the lock arm 64 between the lock position and the unlock position against a biasing force of the tension spring 65. The release arm 66 is pivotally supported by the movable plate 60 at a substantially intermediate portion, and includes rollers 66A and 66B at both ends. The release arm 66 constantly causes the roller 66A to abut on a slide surface 64S, which faces the outer side along the left-right direction of the pit 10, along the longitudinal direction of the L-shape of the lock arm 64. A release plate 67 is provided on the first link 31 of the undulating link device 30. When the release plate 67 of the first link 31 descending with the prone operation of the undulating link device 30 abuts on the roller 66B of the release arm 66 and pushes down the roller 66B, the release arm 66 rotates in an unlock direction and causes the roller 66A to slide along the slide surface 64S of the lock arm 64, displaces the lock arm 64 so as to rise from the lock position side to the unlock position side, and positions the lock arm 64 at the unlock position. When the lock arm 64 is positioned at the unlock position, the movable plate 60 can be raised and lowered between the pit closing position and the in-pit housing position without losing the sustaining and holding state by the lock arm 64. That is, when the lock arm 64 is at the unlock position, a pushing roller 68 provided on the intermediate link 33 of the undulating link device 30 pushes an upper surface of the movable plate 60 against the spring forces of the tension springs 77 and 78 so that the movable plate 60 can be pushed into the in-pit housing position by contracting the X link device 70.

When the movable plate 60 is pushed from the pit closing position to the in-pit housing position side, the upper end of the rising lock arm 64 positioned at the unlock position and the roller 64B push an opening/closing lid 60K (FIG. 1) provided on the movable plate 60 from below to be open and protrudes outward from such an open window.

Further, the movable plate 60 of the embodiment is provided with a main plate 60A attached close to a central portion along the left-right direction of the pit 10 on the top of the raising/lowering frame 61 and is provided with a copying plate 60B hinged to an end close to the outer side of the main plate 60A. The movable plate 60 at the pit closing position causes the copying plate 60B to be positioned on a horizontal plane that is flush with the main plate 60A. As shown in FIG. 9, the movable plate 60 between the pit closing position and the in-pit housing position causes a roller 60C included in the copying plate 60B to swing in accordance with a cam piece 60L provided on the first link 31 of the undulating link device 30, and causes the copying plate 60B to be introduced between the first link 31 and the intermediate link 33 of the undulating link device 30 set in the prone state.

Therefore, in each of the raising/lowering devices 20, the movable plate 60 is raised and lowered between the pit closing position and the in-pit housing position as follows along with raising and lowering operations of the vehicle support table 40 and the movable pit cover 50 performed by the undulating operation of the undulating link device 30.

(1) When the raising/lowering actuator 21 of each of the raising/lowering devices 20 moves up the undulating link device 30 on the lift-up side, the movable pit cover 50 accompanying the second sub-link 32S of the undulating link device 30 is separated upward from the sub-opening portion 11B of the pit 10, and the pushing roller 68 provided on the intermediate link 33 of the undulating link device 30 is positioned on the upper side separated from the upper surface of the movable plate 60, the movable plate 60 is mounted on the X link device 70 positioned at the rising end by the spring forces of the tension springs 77 and 78 to close the sub-opening portion 11B of the pit 10 and is set at a raised position to be flush with the upper surfaces of the front and rear fixed pit covers 15 as shown in FIG. 9.

At this time, the movable plate 60 is supported from below by the lock arm 64 that is positioned at the lock position to be in the sustaining state, and is held at the above-described pit closing position to form the work floor that is flush with the front and rear fixed pit covers 15.

(2) When the raising/lowering actuator 21 of each of the raising/lowering devices 20 causes the undulating link device 30 to be prone from the above (1) and the release plate 67 provided on the first link 31 of the undulating link device 30 positions the lock arm 64 at the unlock position via the release arm 66, the movable plate 60 loses the sustaining and holding state by the lock arm 64 to be capable of being raised and lowered between the pit closing position and the in-pit housing position as shown in FIG. 10.

At this time, the pushing roller 68 provided on the intermediate link 33 of the undulating link device 30 pushes the upper surface of the movable plate 60 against the spring forces of the tension springs 77 and 78 so that the movable plate 60 can be pushed toward the in-pit housing position by contracting the X link device 70.

(3) When the raising/lowering actuator 21 of each of the raising/lowering devices 20 causes the undulating link device 30 to be more prone from the above (2), the movable pit cover 50 is positioned at the floor position that is flush with the upper surfaces of the front and rear fixed pit covers 15 described above, and the vehicle support table 40 is positioned at the lift-down position that is flush with the upper surfaces of the front and rear fixed pit covers 15 as described above, the X link device 70 is contracted up to a contraction end by the pushing roller 68 provided on the intermediate link 33 of the undulating link device 30 to hold the movable plate 60 pushed up to the in-pit housing position as shown in FIG. 11.

When the raising/lowering actuator 21 of each of the raising/lowering devices 20 erects the undulating link device 30 from the lift-down state of the above (3) toward the lift-up side of the above (1), the movable plate 60 is raised from the in-pit housing position and is set to the pit closing position in the reverse procedure of the above (1) to (3).

The vehicle lift device 100 generally performs the lift operation as follows.

(1) When the raising/lowering actuator 21 of each of the raising/lowering devices 20 positions the vehicle support table 40 at the lift-down position (lift standby stage) by the undulating link device 30, the vehicle support table 40 closes the left and right main opening portions 11A of the pit 10 as shown in FIG. 12.

At the same time, the movable pit cover 50 of each of the raising/lowering devices 20 closes each half of the sub-opening portion 11B, which is the central part sandwiched between the main opening portions 11A of the pit 10 as shown in FIG. 12.

As a result, the vehicle support table 40 and the movable pit cover 50 of each of the raising/lowering devices 20 are positioned at the floor positions flush with the front and rear fixed pit covers 15, and form a pedestrian surface for the worker and an approach road surface for a maintenance target vehicle together with the front and rear fixed pit covers 15 to be flush with the floor of the maintenance site in the maintenance work area. The maintenance target vehicle enters the maintenance work area and stops. At this time, the movable plate 60 is positioned at the in-pit housing position.

(2) When the raising/lowering actuator 21 of each of the raising/lowering devices 20 positions the vehicle support table 40 at the lift initial stage that exceeds, for example, 150 mm from the lift-down position (lift stage) of the above (1) by the undulating link device 30, the vehicle support table 40 enables the turning arm 42 to turn with respect to the lower surface of the lift target vehicle so that the turning arm 42 is positioned at a lift point on the lower surface of the maintenance target vehicle as shown in FIGS. 13 and 14.

At this time, the movable pit cover 50 is kept at the floor position that is flush with the front and rear fixed pit covers 15 to keep the pedestrian surface for the worker and the approach road surface for the maintenance target vehicle formed in the above (1).

Figure 15:
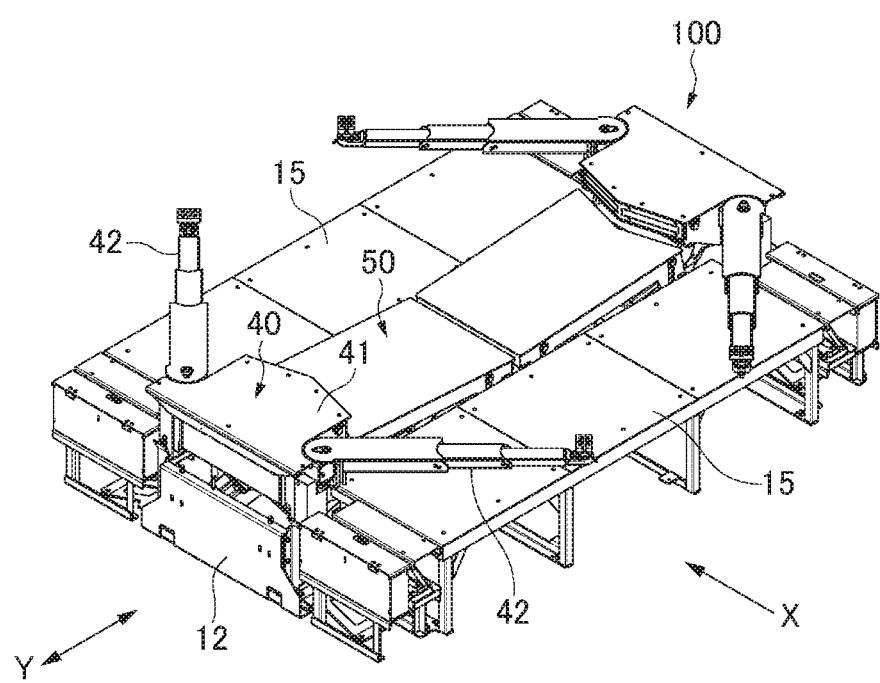
FIG. 15 is a perspective view showing the movable pit cover associated with the undulating link device in each raising/lowering device of the vehicle lift device.
Figure 16:
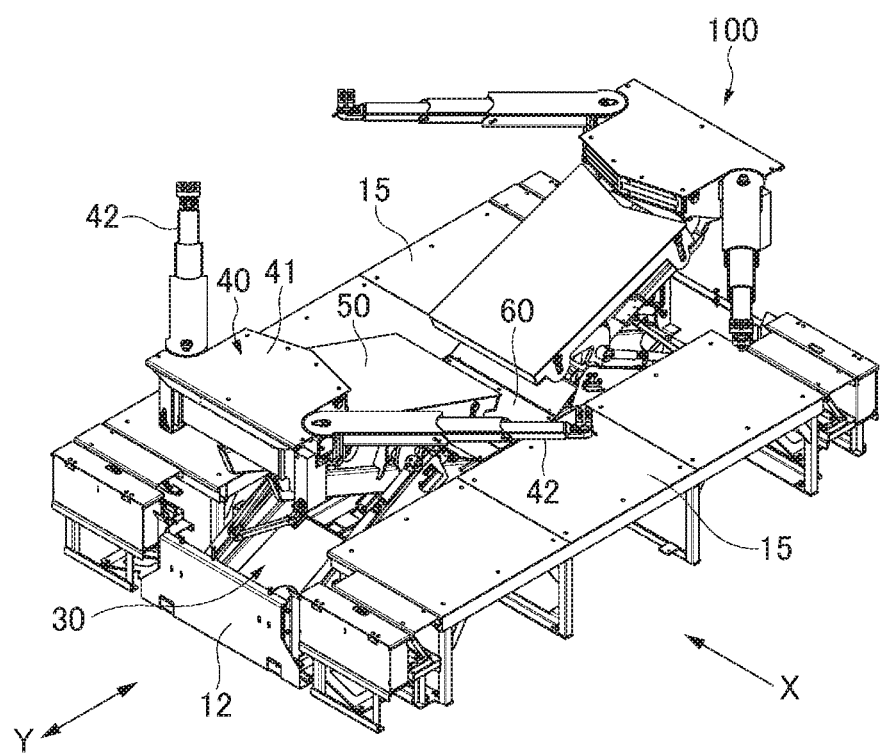
FIG. 16 is a perspective view showing a lift intermediate state in which each raising/lowering device of the vehicle lift device is positioned at a lift intermediate position.

(3) When the raising/lowering actuator 21 of each of the raising/lowering devices 20 raises the vehicle support table 40 to the lift-up position side from the lift initial stage of the above (2) by the undulating link device 30, and the turning arm 42 of the vehicle support table 40 lifts the vehicle via the lift point of the maintenance target vehicle, the movable pit cover 50 is lifted to the lift-up position side on the lower side of the maintenance target vehicle accompanying the movement of the second sub-link 32S of the undulating link device 30 and is separated upward from the opening level of the pit 10 (sub-opening portion 11B) as shown in FIGS. 15 and 16.

Figure 17:
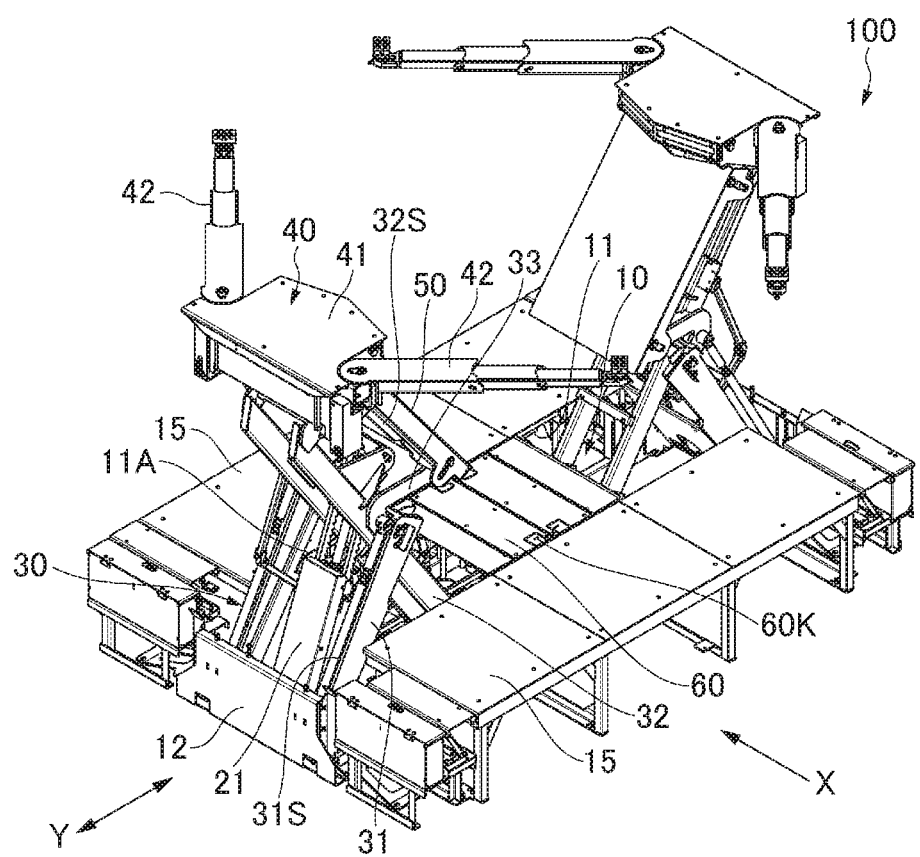
FIG. 17 is a perspective view showing a lift-up state in which each raising/lowering device of the vehicle lift device is positioned at a lift-up position.

(4) When the raising/lowering actuator 21 of each of the raising/lowering devices 20 raises the vehicle support table 40 further to the lift-up position side from the above (3) by the undulating link device 30, the movable plate 60 is raised from the in-pit housing position and is positioned at the pit closing position as shown in FIG. 17. The movable plate 60 closes at least a part of the sub-opening portion 11B in the pit 10 where the movable pit cover 50 is separated, and forms the work floor on the sub-opening portion 11B.

As a result, the worker can perform maintenance of the maintenance target vehicle, positioned at the lift-up position by the vehicle support table 40, from below on the above-described work floor formed by the front and rear fixed pit covers 15 and the movable plates 60.

When the raising/lowering actuator 21 causes the undulating link device 30 to be prone from the lift-up state of the above (4) toward the lift-down position (lift stage) of the above (1) in each of the raising/lowering devices 20, the vehicle support table 40, the movable pit cover 50, and the movable plate 60 are displaced from the lift-up position to the lift-down position (lift standby stage) via the lift initial stage in the reverse procedure of the above (1) to (4).

Figure 2:
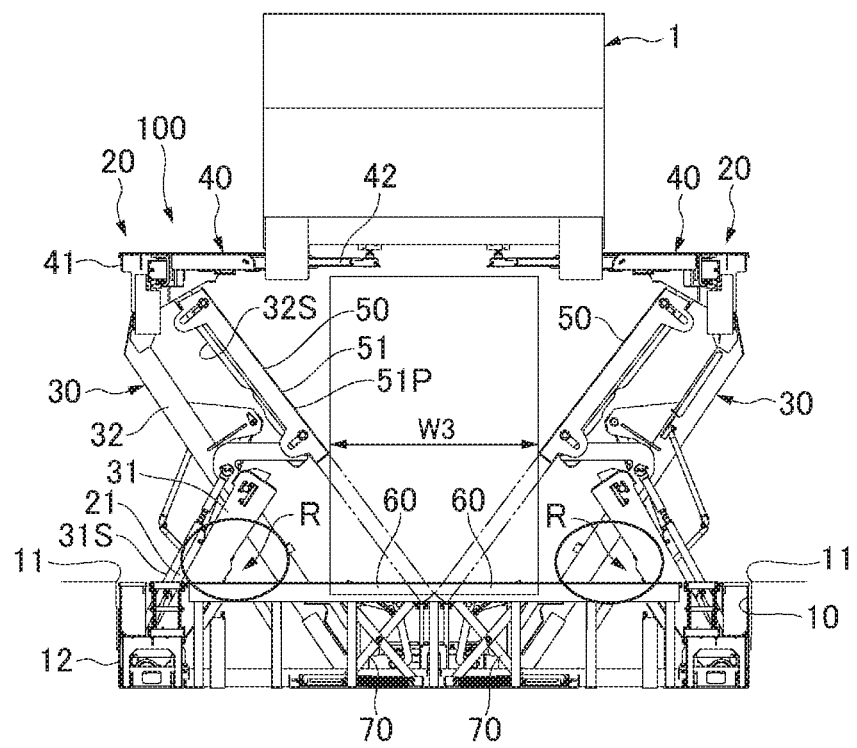
FIG. 2 is a front view showing the vehicle lift device.

When the vehicle support table 40 of each of the raising/lowering devices 20 is positioned at the lift-up position as shown in FIG. 2 in the vehicle lift device 100, the cover plate 51 of the movable pit cover 50 in each of the raising/lowering devices 20 serves as a wall surface 51P for maintenance work, and a work instruction sheet or the like can be attached to the wall surface 51P.

Figure 22:
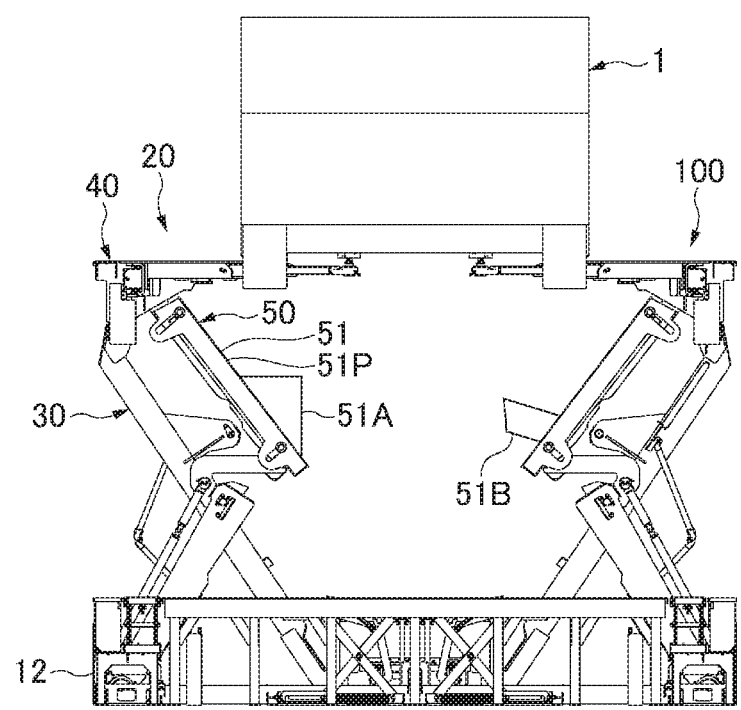
FIG. 22 is a front view showing a modification of the vehicle lift device.
Figure 23:
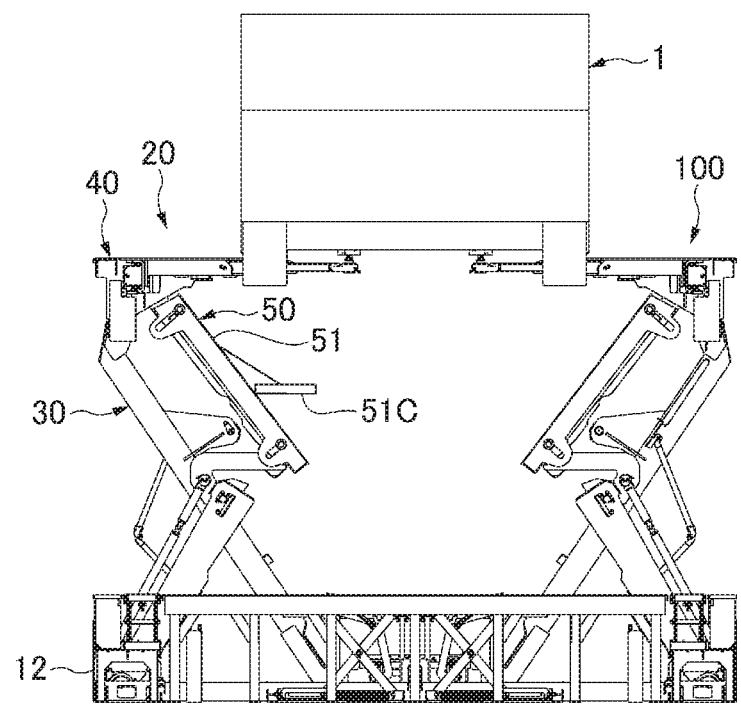
FIG. 23 is a front view showing another modification of the vehicle lift device.

In the vehicle lift device 100, a work table 51A and a parts box 51B as shown in FIG. 22 may be attachable and detached to and from a surface of the wall surface 51P for maintenance work in the cover plate 51 of the movable pit cover 50 of each of the raising/lowering devices 20, or a part of the cover plate 51 can be cut out as shown in FIG. 23 so as to be turned over, and this part can be used as a work table 51C.

Each of the raising/lowering devices 20 may have seven sections of the rack 12, the first link 31, the second link 32, the first sub-link 31S, the second sub-link 32S, the intermediate link 33, and the vehicle support table 40, and the respective links forming the seven sections may be displaced along the left-right direction orthogonal to the approach direction of the vehicle 1, and the undulating link device 30 may be configured to be capable of keeping the vehicle support table 40 in a horizontal state to be raised and lowered only in the vertical direction as shown in FIGS. 24A and 24B or FIGS. 25A and 25B.

The undulating link device 30 of each of the raising/lowering devices 20 shown in FIGS. 24A to 25B pivotally supports a lower end a of the first link 31 on the rotating support portion 13 provided on the rack 12, slidably supports a lower end a of the second link 32 having a length of 2×L1, which is twice a length L1 of the first link 31, by the sliding support portion 14 provided on the rack 12, pivotally attaches an upper end b of the first link 31 to an intermediate link 33 together with a midpoint c of the second link 32, and pivotally attaches an upper end b of the second link 32 to the vehicle support table 40 (lift table 41). Further, each of the raising/lowering devices 20 pivotally attaches both ends a and b of a first sub-link 31S having the same length as the first link 31 to the rack 12 and the intermediate link 33 to form a parallelogram link mechanism 20A by four sections of the first link 31, the first sub-link 31S, the rack 12, and the intermediate link 33. Further, each of the raising/lowering devices 20 pivotally attaches both ends a and b of a second sub-link 32S, which has a length half the length of the second link 32, to the vehicle support table 40 (lift table 41) and the intermediate link 33 to form the parallelogram link mechanism 20B by four sections of the second link 32, the second sub-link 32S, the vehicle support table 40 (lift table 41), and the intermediate link 33. At this time, both the upper end of the first sub-link 31S and the lower end b of the second sub-link 32S are pivotally attached to the intermediate link 33 at the same point. An interval L2 between both the lower ends a of the first link 31 and the first sub-link 31S, an interval L2 between the upper end b of the first link 31 (or the midpoint c of the second link 32) and the upper end b of the first sub-link 31S (or the lower end a of the second sub-link 32S), and an interval L2 between both the upper ends b of the second link 32 and the second sub-link 32S are set to be the same.

Figure 24A:
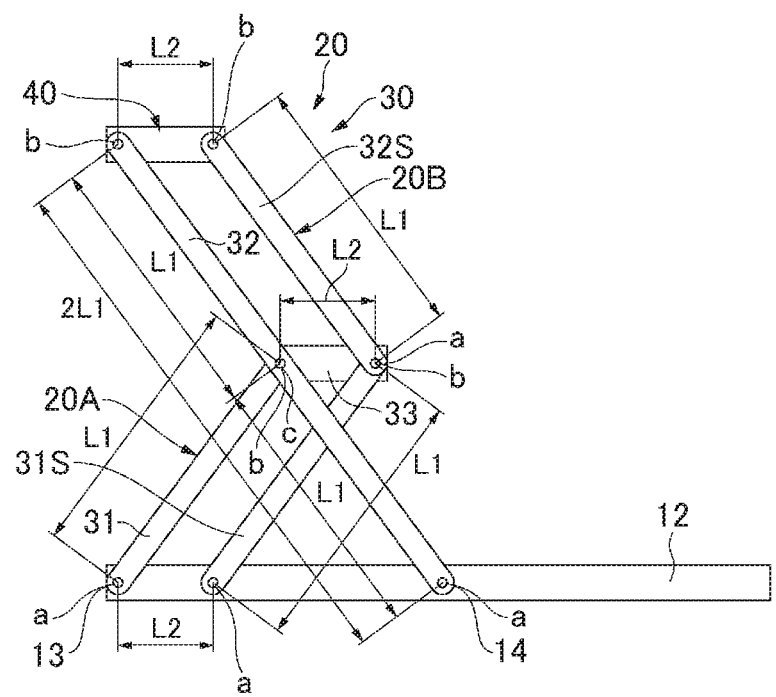
FIGS. 24A and 24B show a modification of the undulating link device.
Figure 24B:
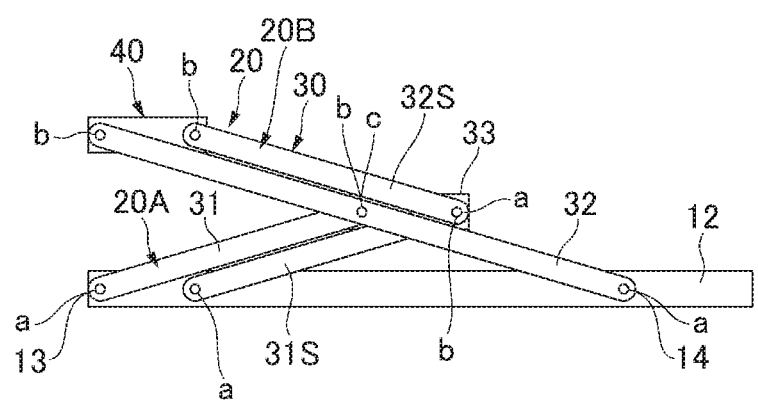
Figure 25A:
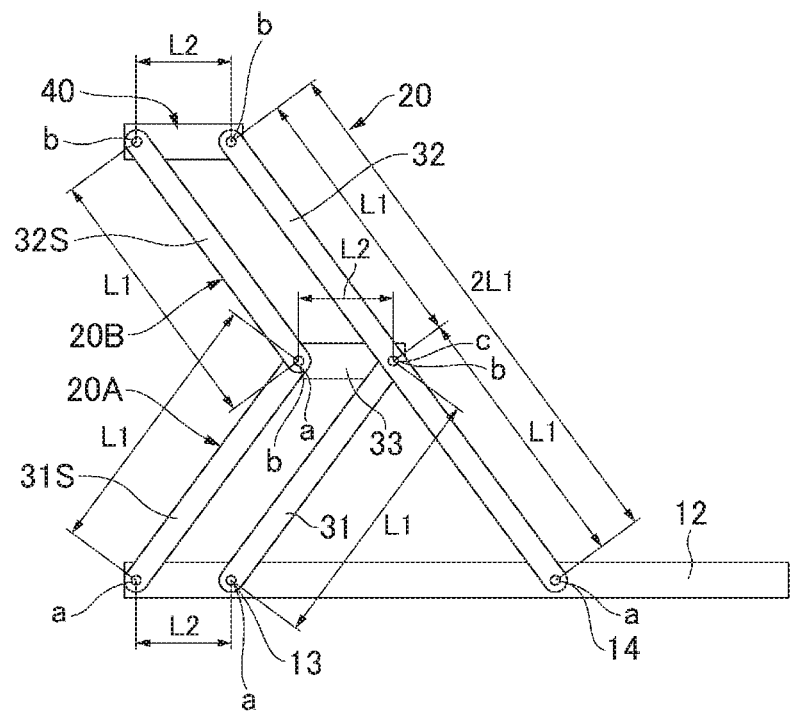
FIGS. 25A and 25B show another modification of the undulating link device.
Figure 25B:
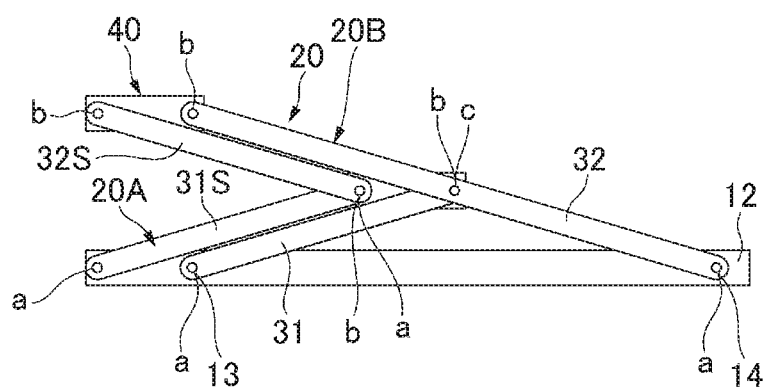

As a result, in the undulating link device 30 of each of the raising/lowering devices 20, the constituent links thereof are displaced along the left-right direction orthogonal to the approach direction of the vehicle 1, and the vehicle support table 40 can be kept in the horizontal state to be raised and lowered only in the vertical direction. FIGS. 24A and 25A show a lift-up state, and FIGS. 24B and 25B show a lift intermediate state.

Figure 26A:
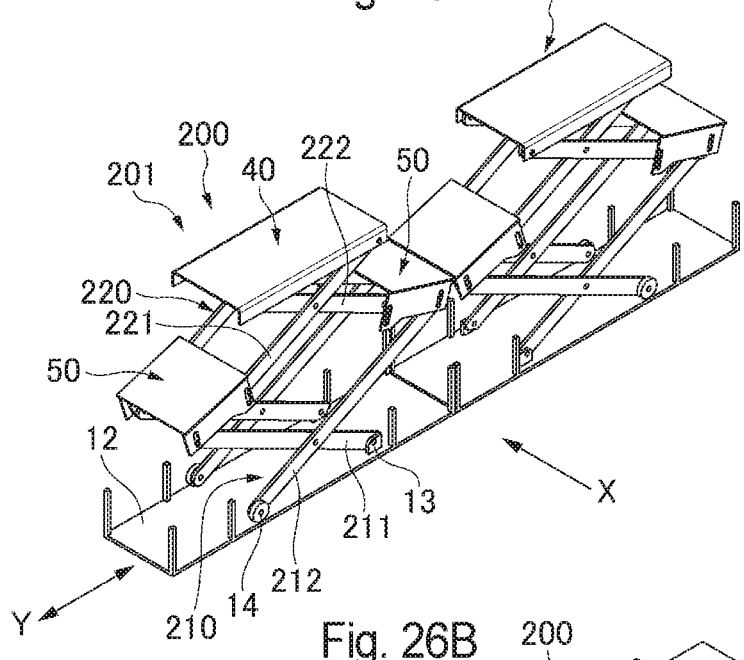
FIGS. 26A to 26C show a modification of the vehicle lift device.
Figure 26B:
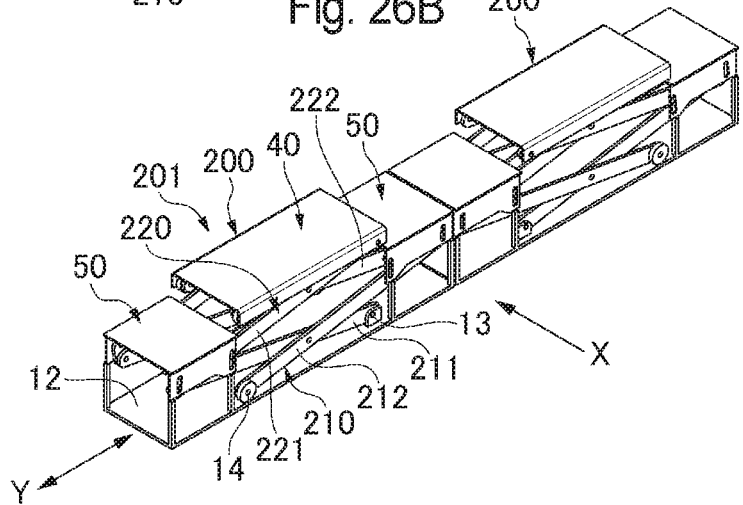
Figure 26C:
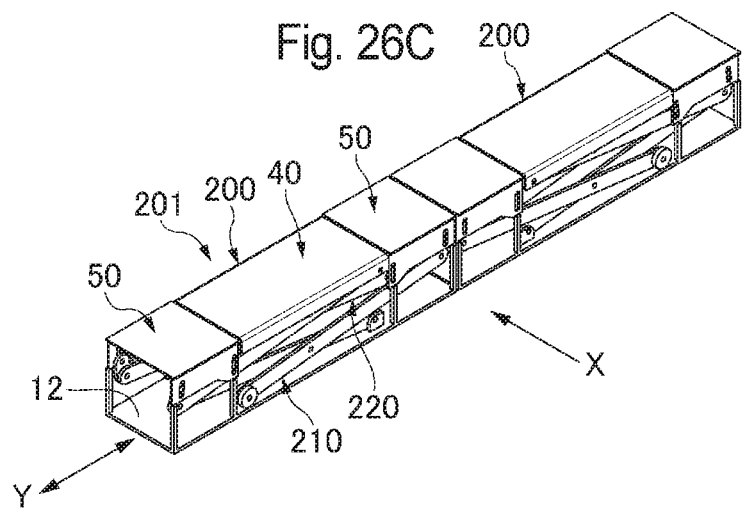

As shown in FIGS. 26A to 26C, each of the raising/lowering devices 20 can be modified into a raising/lowering device 200 that is configured using a combination of two upper and lower X link devices.

An undulating link device 201 of each of the raising/lowering devices 200 is configured using a combination of a lower link device 210 supported by the rack 12 and an upper X link device 220 that is mounted on the lower link device 210 and supports the vehicle support table 40. The lower link device 210 has two links 211 and 212 that are pin-coupled in an X shape, pivotally supports a lower end of the link 211 by the rotating support portion 13 provided on the rack 12, and slidably supports a lower end of the link 212 by the sliding support portion 14 provided on the rack 12. The upper X link device 220 has two links 221 and 222 that are pin-coupled in an X shape, pivotally attaches a lower end of the link 221 to an upper end of the link 211, pivotally attaches a lower end of the link 222 to an upper end of the link 212, pivotally supports the vehicle support table 40 at an upper end of the link 221, and slidably supports the vehicle support table 40 at an upper end of the link 222.

The movable pit cover 50 is attached to each of the links 221 and 222 of the upper X link device 220 in the same manner as the movable pit cover 50 is attached to the second sub-link 32S in the undulating link device 30 described above.

As a result, in the undulating link device 201 of each of the raising/lowering devices 200, the constituent links thereof are displaced along the left-right direction Y orthogonal to the approach direction X of the vehicle 1, and the vehicle support table 40 can be kept in the horizontal state to be raised and lowered only in the extending direction. FIG. 26A shows a lift-up state, FIG. 26B shows a lift initial stage, and FIG. 26C shows a lift-down state (lift standby stage).

Therefore, the following functions and effects are achieved according to the embodiment.

Figure 6A:
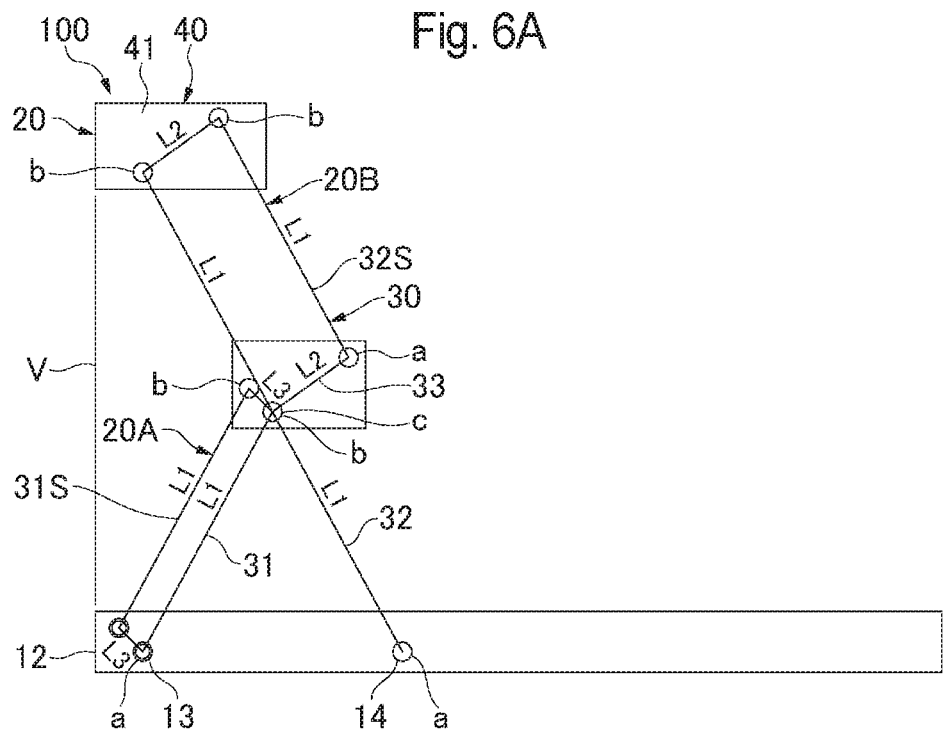
FIGS. 6A to 6C show constituent links of the undulating link device shown in FIGS. 5A to 5C.
Figure 6B:
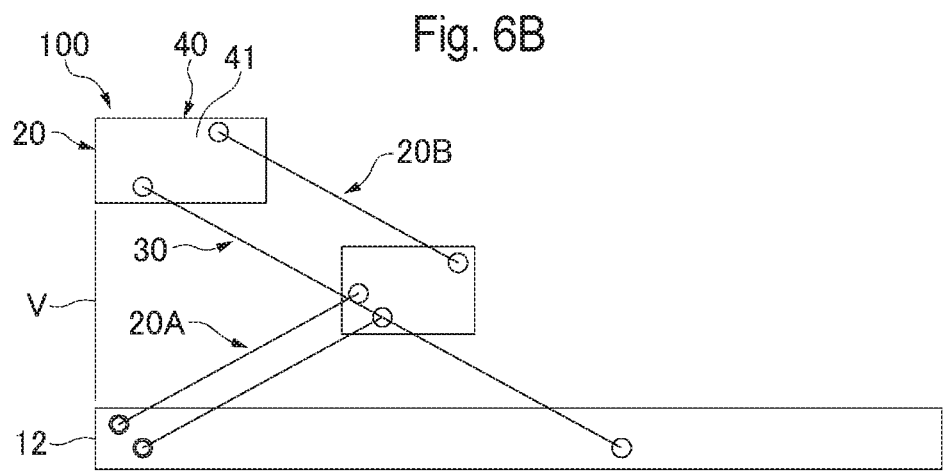
Figure 6C:
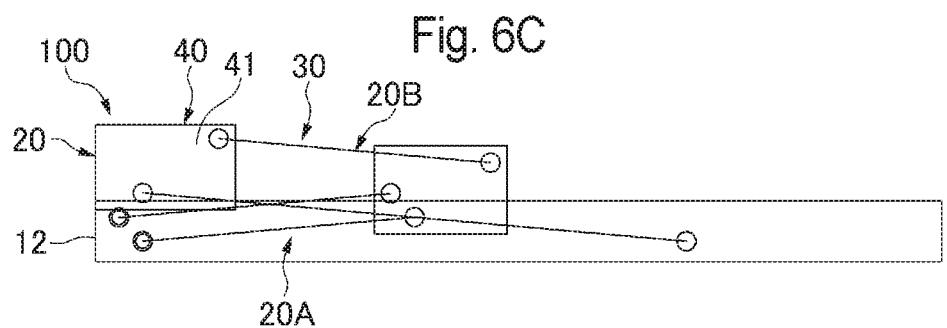

(a) The undulating link device 30 of each of the raising/lowering devices 20 has each link displaced along the left-right direction orthogonal to the approach direction of the vehicle 1, and keeps the vehicle support table 40 in the horizontal state as shown in FIGS. 5A to 6C to be raised and lowered only in the vertical direction along the same vertical line V shown in FIGS. 6A and 6B. As a result, the vehicle 1 can be lifted while stably supporting left and right lift points (or left and right tires) of the vehicle 1 on the vehicle support table 40 without being pulled in the opposite direction of the left and right.

Figure 3:
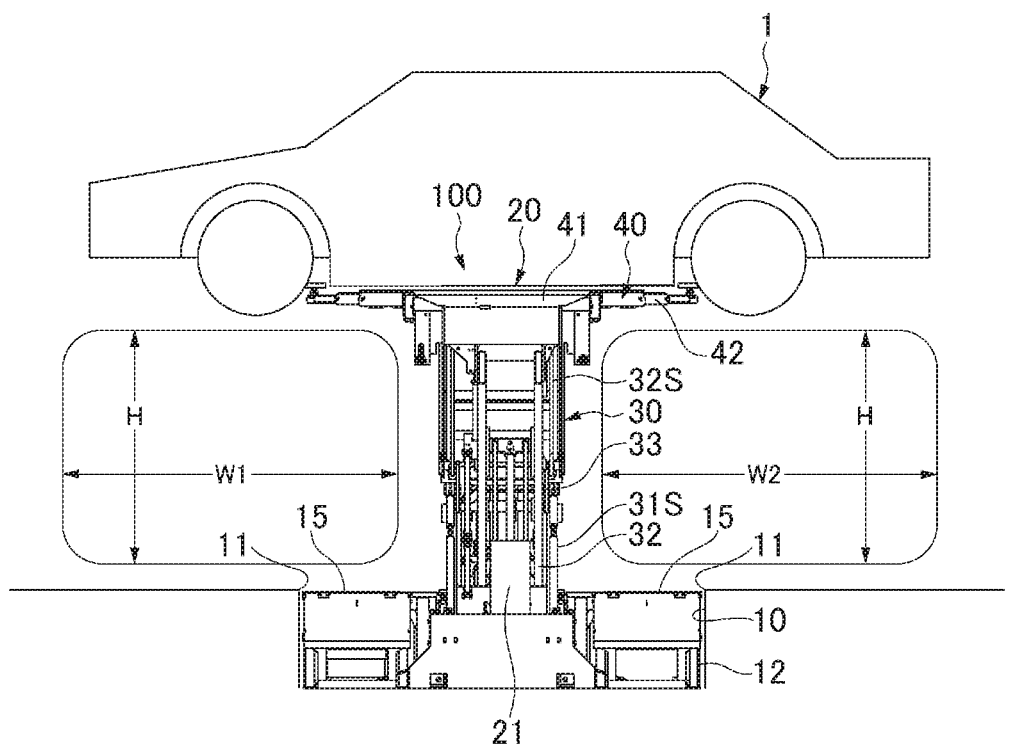
FIG. 3 is a side view showing the vehicle lift device.
Figure 4:
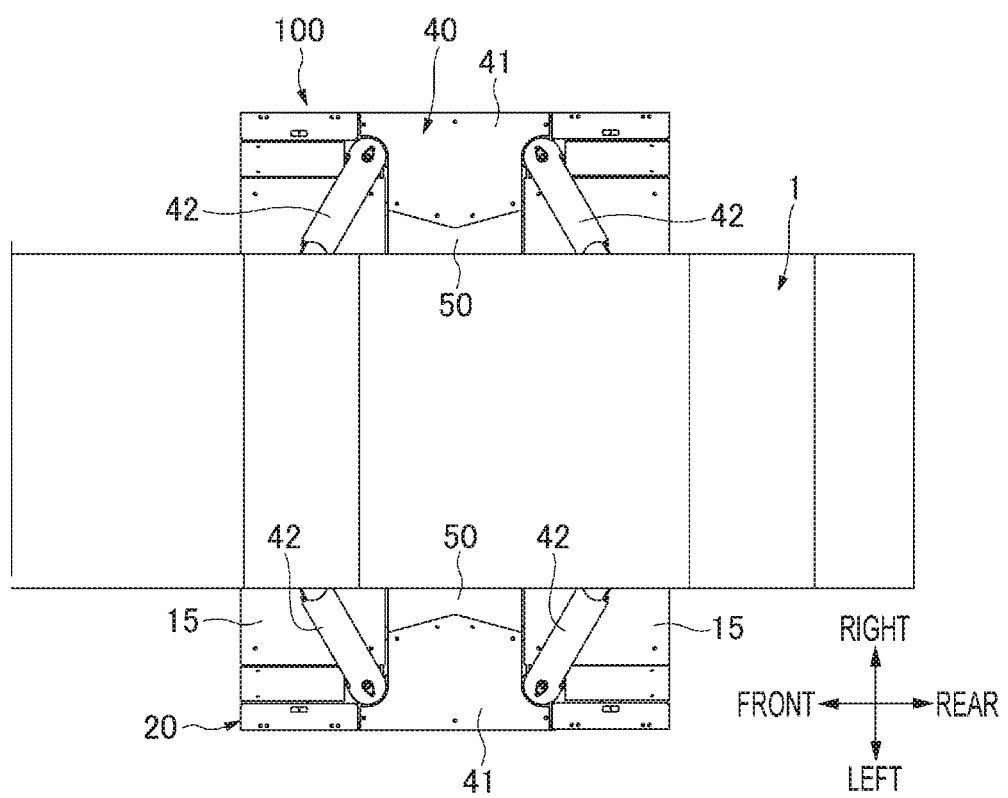
FIG. 4 is a plan view showing the vehicle lift device.
Figure 18C:
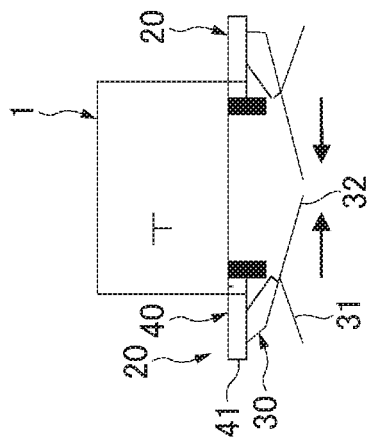
FIGS. 18A to 18C show a configuration of each raising/lowering device in the vehicle lift device.
Figure 18B:
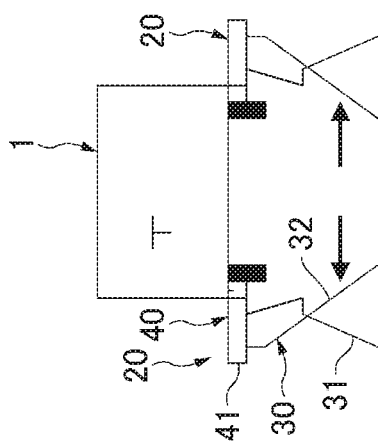
Figure 18A:
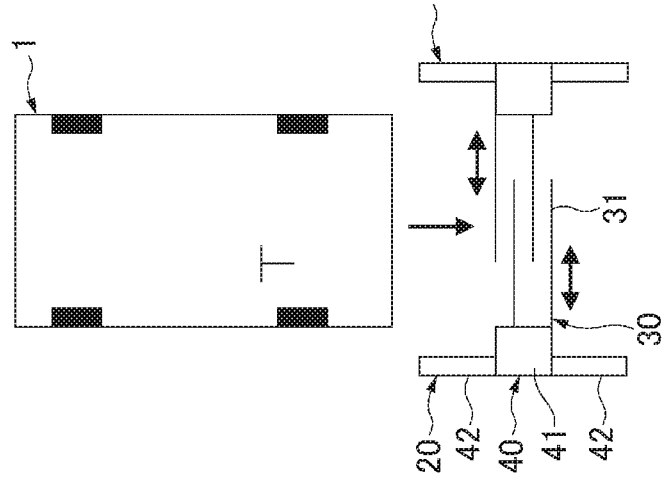
Figure 20A:
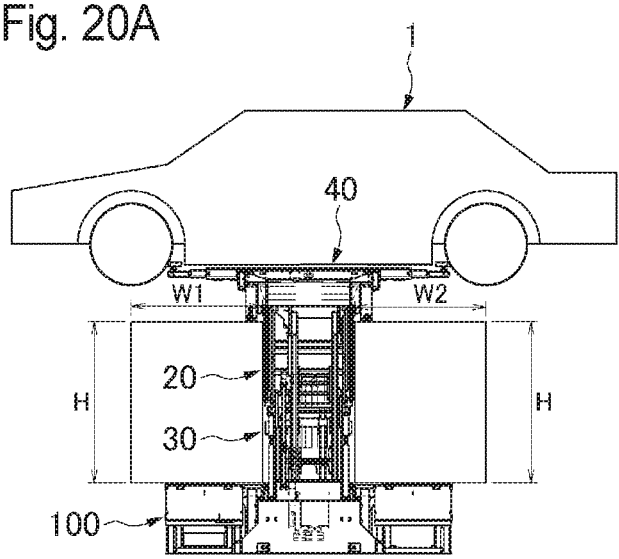
FIGS. 20A to 20C show a vehicle lift device.
Figure 20B:
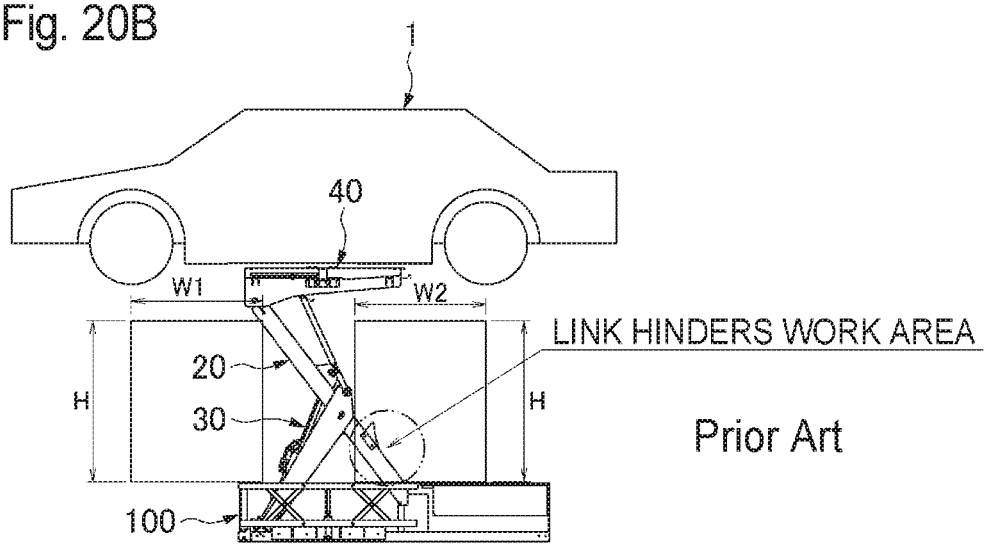
Figure 20C:
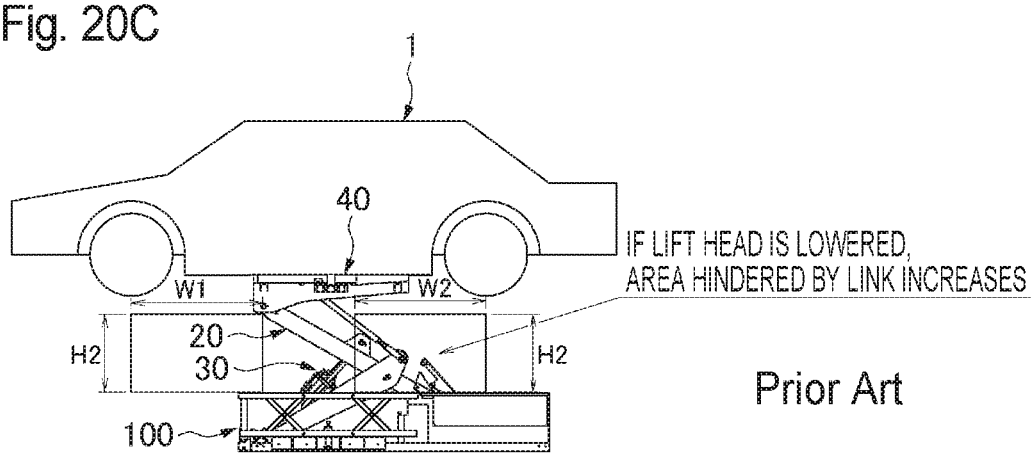

(b) In the undulating link device 30 of each of the raising/lowering devices 20, each link is displaced along the left-right direction orthogonal to the approach direction of the vehicle 1. As a result, it is possible to achieve mitigation of a bending load acting on each link and to reduce rigidity required for each link (for example, a width of the link element constituting each link) since each of the undulating link devices 30 lifts the vehicle 1 while resisting vehicle weight in a wide range from the outer side to the inner side along the vehicle width direction immediately below the lift target vehicle 1 in the maintenance work area as shown in FIGS. 18A to 18C. As a result, the overall size of the undulating link device 30 can be made compact. This means that it is possible to reduce an installation space for the undulating link device 30 in the maintenance work area and to secure wide maintenance work spaces W1 and W2 immediately below the lifted vehicle 1 to improve the maintenance workability as shown in FIGS. 3 and 20A.

(c) In the undulating link device 30 of each of the raising/lowering devices 20, each link is displaced along the left-right direction orthogonal to the approach direction of the vehicle 1. As a result, each of the undulating link devices 30 is arranged only in a portion immediately below the central portion sandwiched between a front wheel side and a rear wheel side along the vehicle longitudinal direction of the lift target vehicle 1 to move up and down, and thus, it is possible to secure the wide maintenance work spaces W1 and W2 on the front wheel side and the rear wheel side immediately below the vehicle as shown in FIGS. 3 and 20A. Moreover, these maintenance work spaces W1 and W2 are constant without being affected by a lift height H of the vehicle 1. Therefore, it is possible to improve the maintenance workability of an engine, a suspension system, a transmission, a battery, and the like located on the front wheel side and the rear wheel side of the vehicle 1.

(d) In the undulating link device 30 of each of the raising/lowering devices 20, each link is displaced along the left-right direction orthogonal to the approach direction of the vehicle 1. Therefore, the respective undulating link devices 30 can be arranged to be point-symmetrical with each other and can be common with each other, and the vehicle support table 40 can be shared with each other, and thus, the number of components of each of the raising/lowering devices 20 is reduced, and the number of assembling steps can be reduced so that the productivity of the vehicle lift device can be improved.

Each of the raising/lowering devices 20 has no directionality in the vehicle approach direction, and it is possible to perform maintenance work even if the vehicle 1 approaches from either of two directions along the vehicle approach direction.

(e) The undulating link device 30 of each of the raising/lowering devices 20 has the first link 31 pivotally supported by the rotating support portion 13 near one side along the left-right direction of the pit 10, and the second link 32 slidably supported by the sliding support portion 14 near the other side along the left-right direction of the pit 10. Therefore, each of the undulating link devices 30 lifts the vehicle 1 while stably resisting vehicle weight in the wide range along the vehicle width direction immediately below the lift target vehicle 1 with the two links, that is, the first link 31 moving up and down near the outer side along the vehicle width direction immediately below the lift target vehicle 1 in the maintenance work area and the second link 32 moving up and down near the inner side, thereby stably realizing the above (b).

(f) Each of the raising/lowering devices 20 can form the work floor closed by the movable plate 60 at the central part of the opening sandwiched between the raising/lowering devices 20 on both sides when the vehicle support table 40 is raised from the opening 11 of the pit 10. The worker can perform the maintenance work on a wide work floor formed by the existing work floors on the front and rear of the pit 10 and the work floor formed by the movable plate 60 at the center.

(g) When the vehicle support table 40 of each of the raising/lowering devices 20 is positioned at the lift-up position and an intersection of the first and second links 31 and 32 is arranged to be higher than each of existing front and rear work floors, a triangular inter-link gap R, which is formed immediately below the intersection and on the upper side of the work floor by being sandwiched by lower edges of the first and second links 31 and 32 below the intersection, faces each of the front and rear work floors as shown in FIGS. 1 and 2. When the raising/lowering device 20 is lowered so that this triangular inter-link gap R is displaced to be reduced, the worker does not exist below the descending vehicle 1, and it is possible to eliminate the risk that a foot is pinched in the inter-link gap R that is displaced to be reduced.

(h) Each of the links constituting the undulating link device 30 of each of the raising/lowering devices 20 is configured using the assembly of two link members (a set of the two link plates 31P and 31P regarding the first link 31) that form a pair, and each of two link elements constituting each of the link in the raising/lowering device 20 on the left side and each of two link elements constituting each of the links in the raising/lowering device 20 on the right side are arranged in an overlapping manner to be different from each other in the approach direction X of the vehicle 1 as shown in FIG. 21A. Therefore, the area occupied by both the raising/lowering devices 20 in the maintenance site can be reduced. As a result, an earthwork area of the maintenance site can be reduced, and the area of the pit 10 can also be reduced.

Figure 21B:
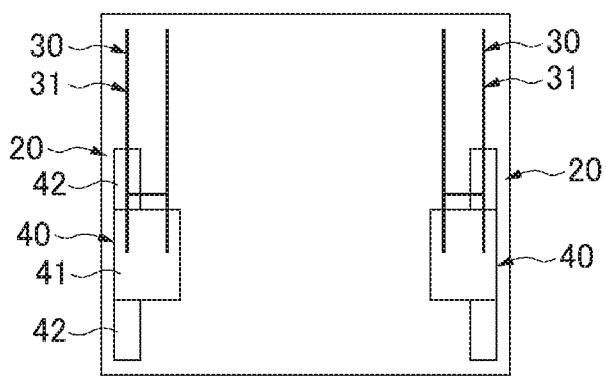
Figure 21C:
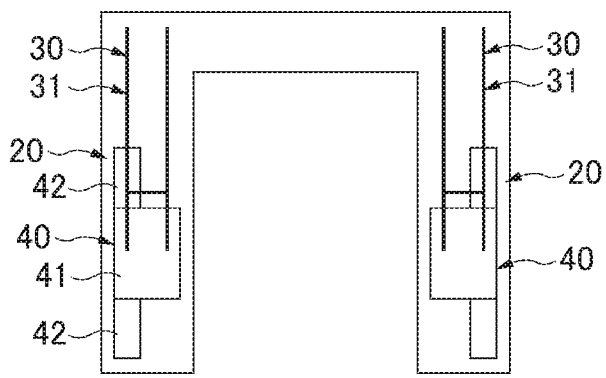

In a conventional example shown in FIGS. 19A to 19C, an earthwork area of a maintenance site and the area of a pit are large as shown in FIG. 21B or 21C.

(i) Each of the raising/lowering devices 20 has each movable pit cover 50 that is attached to a constituent link of the undulating link device 30 to be capable of accompanying the undulating link device 30, and when the vehicle support table 40 is positioned at the lift-down position, the movable pit cover 50 of each of the raising/lowering devices 20 closes a part of the opening 11 of the pit 10 which is not closed by the vehicle support table 40 in the opening 11 of the pit 10. At this time, the movable pit cover 50 closes substantially the entire opening 11 of the pit 10 together with the vehicle support table 40, and it is possible to allow the vehicle 1 to enter the maintenance work area by forming the pedestrian surface for the worker and forming the approach road surface for the maintenance target vehicle 1.

Further, a wide maintenance work space W3 that is not hindered by the movable pit cover 50 is secured immediately below the lift target vehicle 1 as shown in FIG. 2 during the maintenance work in which the movable pit cover 50 is separated upward from a part of the opening of the pit 10 during the process of raising the vehicle support table 40 from the lift-down position and the vehicle support table 40 is raised to the lift-up position.

(j) When each of the raising/lowering devices 20 pivotally supports the lower end of the first link 31 by the rotating support portion 13 provided on the rack 12 inside the pit 10, slidably supports the lower end of the second link 32, which has the length twice the length of the first link 31, by the sliding support portion 14 provided on the rack 12 inside the pit 10, pivotally attaches the upper end of the first link 31 to the intermediate link 33 together with the midpoint of the second link 32, pivotally attaches the upper end of the second link 32 to the vehicle support table 40, pivotally attaches both ends of the first sub-link 31S, which has the identical length to the first link 31, to the rack 12 and the intermediate link 33 to form the parallelogram link mechanism 20A by four sections of the first link 31, the first sub-link 31S, the rack 12, and the intermediate link 33, and pivotally attaches both ends of the second sub-link 32S, which has the length half the length of the second link 32, to the vehicle support table 40 and the intermediate link 33 to form the parallelogram link mechanism 20B by four sections of the second link 32, the second sub-link 32S, the vehicle support table 40, and the intermediate link 33, the vehicle support table 40 can be raised and lowered only in the vertical direction while being kept in the horizontal state as described above (a). Further, the movable pit cover 50 of the above (i) can be attached to the second sub-link 32S.

Regarding the embodiment of the invention described above, the invention further discloses the following vehicle lift device.

<1> Each of the raising/lowering devices 20 has each of the movable pit covers 50 that is attached to the second sub-link 32S, which is a constituent link of the undulating link device 30, to be capable of accompanying the undulating link device 30, and when the vehicle support table 40 is positioned on the lift-down position side, the movable pit cover 50 closes the sub-opening portion 11B, which is the other part of the opening 11 of the pit 10 which is not closed by the vehicle support table 40. Therefore, when the vehicle support table 40 is positioned on the lift-down position side while achieving reduction in size of the vehicle support table 40 in order to enable improvement of the maintenance workability by reducing the range in which the vehicle support table 40 positioned at the lift-up position covers the lower surface of the vehicle or to realize the lighter and more compact vehicle lift device, the movable pit cover 50 that closes the sub-opening portion 11B of the pit 10 closes substantially the entire opening 11 of the pit 10 including the main opening portion 11A and the sub-opening portion 11B of the pit 10 together with the vehicle support table 40 that closes the main opening portion 11A of the pit 10 to form the pedestrian surface for the worker, and it is possible to allow the vehicle to enter the maintenance work area by forming the approach road surface for the maintenance target vehicle.

Further, the sub-opening portion 11B of the pit 10 is open by each of the movable pit covers 50 in the process in which each of the vehicle support tables 40 is raised from the lift-down position so that the undulating link device 30 is movable inside and outside the pit 10 through the relatively large opening 11 of the pit 10 including the sub-opening portion 11B and the main opening portion 11A. At this time, in the undulating link device 30 of each of the raising/lowering devices 20, each link is not necessarily displaced along the left-right direction Y orthogonal to the approach direction X of the vehicle 1, but each link may be displaced along the direction along the approach direction X of the vehicle 1.

Figure 27A:
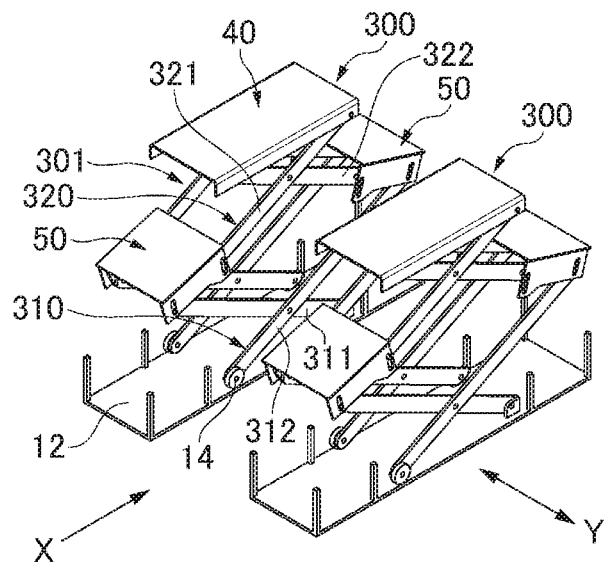
FIGS. 27A to 27C show another modification of the vehicle lift device.
Figure 27B:
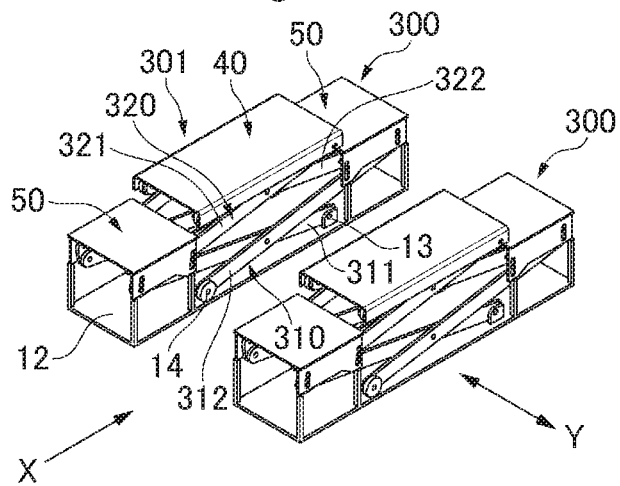
Figure 27C:
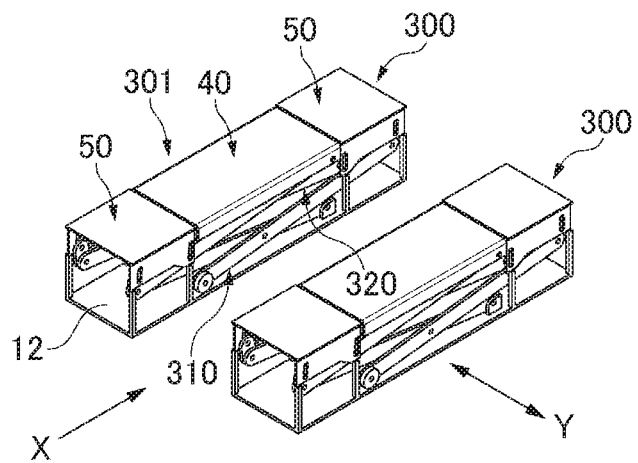

That is, each of the raising/lowering devices 20 can be modified into a raising/lowering device 300 that is configured using a combination of two upper and lower X link devices as shown in FIGS. 27A to 27C.

An undulating link device 301 of each of the raising/lowering devices 300 is configured using a combination of a lower link device 310 supported by the rack 12 and an upper X link device 320 that is mounted on the lower link device 310 and supports the vehicle support table 40. The lower link device 310 has two links 311 and 312 that are pin-coupled in an X shape, pivotally supports a lower end of the link 311 by the rotating support portion 13 provided on the rack 12, and slidably supports a lower end of the link 312 by the sliding support portion 14 provided on the rack 12. The upper X link device 320 has two links 321 and 322 that are pin-coupled in an X shape, pivotally attaches a lower end of the link 321 to an upper end of the link 311, pivotally attaches a lower end of the link 322 to an upper end of the link 312, pivotally supports the vehicle support table 40 at an upper end of the link 321, and slidably supports the vehicle support table 40 at an upper end of the link 322.

The movable pit cover 50 is attached to each of the links 321 and 322 of the upper X link device 320 in the same manner as the movable pit cover 50 is attached to the second sub-link 32S in the undulating link device 30 according to a first embodiment.

As a result, in the undulating link device 301 of each of the raising/lowering devices 300, the constituent links thereof are displaced along the approach direction X of the vehicle 1. FIG. 27A shows a lift-up state, FIG. 27B shows a lift initial stage, and FIG. 27C shows a lift-down state (lift standby stage).

<2> The vehicle support table 40 of each of the raising/lowering devices 20 includes the turning arm 42 that can lift the lower surface of the vehicle, which has entered and stopped at the vehicle maintenance work area so as to be capable of turning, each of the raising/lowering devices 20 keeps the movable pit cover 50 at the opening level of pit 10 without accompanying the undulating operation of the undulating link device 30 between the lift standby stage where each of the raising/lowering devices 20 positions the vehicle support table 40 at the lift-down position and the lift initial stage where the vehicle support table 40 starts to be raised from the lift-down position to enable the turning arm 42 to turn with respect to the lower surface of the vehicle at a level above the opening 11 of the pit 10. In a stage where each of the raising/lowering devices 20 raises the vehicle support table 40 from the lift initial stage, the movable pit cover 50 is attached to the constituent link of the undulating link device 30 such that the movable pit cover 50 accompanies the undulating operation of the undulating link device 30 with a certain amount of delay. As a result, each of the raising/lowering devices 20 can keep the movable pit cover 50 at the opening level of the pit 10 in the lift initial stage, and raise the turning arm 42 of the vehicle support table 40 to the level above the opening 11 of the pit 10 to be set to a turning-possible level with respect to the lower surface of the vehicle while forming the approach road surface for the maintenance target vehicle in the above <1> by the movable pit cover 50. This means that it is possible to remove a previous vehicle from the maintenance work area, and then, to cause the next vehicle to approach the maintenance work area and to improve the productivity of maintenance work if the turning arm 42 is lowered to the turning-possible level without lowering the vehicle support table 40 from the lift-up position for the previous vehicle to the lift-down position in the lift standby stage every time a plurality of vehicles continuously approaches the maintenance work area and the maintenance work is repeatedly performed.

<3> The movable pit cover 50 of each of the raising/lowering devices 20 is attached to the second sub-link 32S of the undulating link device 30 via the slotted hole 52K to be relatively movable with respect to the second sub-link 32S in the slotted hole range of the slotted hole 52K, and thus, it is possible to easily realize a relative movement structure of the movable pit cover 50 with respect to the second sub-link 32S of the undulating link device 30.

<4> Each of the raising/lowering devices 20 has the movable plate 60 attached thereto, and the movable plate 60 is set to the pit closing position to close at least a part of the sub-opening portion 11B when the movable pit cover 50 of each of the raising/lowering devices 20 is separated upward from the sub-opening portion 11B of the pit 10. As a result, when the vehicle support table 40 is raised from the lift-down position, the sub-opening portion 11B of the pit 10 that enables the undulating link device 30 to move out of the pit 10 is closed by the movable plate 60, and the work floor for the worker can be formed on the movable plate 60.

<5> The movable pit cover 50 of each of the raising/lowering devices 20 is configured to be separated from the opening level of the pit 10 when the vehicle support table 40 of each of the raising/lowering devices 20 is positioned at the lift-up position. Therefore, the wide maintenance work space that is not hindered by the movable pit cover 50 can be secured immediately below the lift target vehicle during the maintenance work in which the vehicle support table 40 is raised to the lift-up position.

<6> When each of the raising/lowering devices 20 pivotally supports the lower end of the first link 31 by the rotating support portion 13 provided on the rack 12 inside the pit 10, slidably supports the lower end of the second link 32 by the sliding support portion 14 provided on the rack 12 inside the pit 10, pivotally attaches the upper end of the first link 31 to the intermediate link 33 together with the second link 32, pivotally attaches the upper end of the second link 32 to the vehicle support table 40, pivotally attaches both ends of the first sub-link 31S to the rack 12 and the intermediate link 33 to form the parallelogram link mechanism 20A by four sections of the first link 31, the first sub-link 31S, the rack 12, and the intermediate link 33, and pivotally attaches both ends of the second sub-link 32S to the vehicle support table 40 and the intermediate link 33 to form the parallelogram link mechanism 20B by four sections of the second link 32, the second sub-link 32S, the vehicle support table 40, and the intermediate link 33, the movable pit cover 50 in the above <1> is attached to the second sub-link 32S.

As described above, although the embodiments of the invention have been described in detail with reference to the drawings, the concrete configurations of the invention are not limited to the embodiments, and any design alteration or the like within the scope not departing from the gist of the invention is also included in the invention.

According to the invention, it is possible to secure the wide maintenance work space immediately below the lifted vehicle in the vehicle lift device to improve the maintenance workability and to enable improvement of the productivity.

What is claimed is:

1. A vehicle lift device comprising:
   a pair of left and right raising/lowering devices provided on both sides in a left-right direction orthogonal to an approach direction of a vehicle in a maintenance work area where the vehicle enters and stops at a maintenance site, each of the raising/lowering device having an undulating link device constituted by a plurality of links; and
   a vehicle support table that supports the vehicle and is mounted on a top of the undulating link device,
   wherein each of the links of the undulating link device of each of the raising/lowering devices is displaced along the left-right direction orthogonal to the vehicle approach direction to perform an undulating operation so that the vehicle support table is raised and lowered only in a vertical direction while being kept in a horizontal state by the undulating operation.

2. The vehicle lift device according to claim 1, further comprising a pit provided in the maintenance work area defined on a floor of the maintenance site,
   wherein the undulating link device of each of the raising/lowering devices has at least two links including a first link, which is pivotally supported by a rotating support portion, arranged near one side of the pit along the left-right direction orthogonal to the vehicle approach direction inside the pit, and a second link which is slidably supported by a sliding support portion arranged over the one side to another side of the pit along the left-right direction orthogonal to the vehicle approach direction inside the pit.

3. The vehicle lift device according to claim 2, further comprising a movable plate that is provided at a pit closing position to close a central part of an opening sandwiched between the raising/lowering devices on both sides when the vehicle support table of each of the raising/lowering devices is raised from the opening of the pit, and is provided at an in-pit housing position to be housed inside the pit when the vehicle support table is lowered to a lift-down position.

4. The vehicle lift device according to claim 3, wherein when the vehicle support table of each of the raising/lowering devices is positioned at a lift-up position and an intersection of the first and second links is arranged to be higher than each of existing front and rear work floors, a triangular inter-link gap, formed immediately below the intersection and above the work floor by being sandwiched between lower edges of the first and second links below the intersection, faces each of the front and rear work floors.

5. The vehicle lift device according to claim 4, wherein each of the links constituting the undulating link device of each of the raising/lowering devices is configured using an assembly of two link elements that form a pair, and each of two link elements constituting each of the links in the raising/lowering device on a left side and each of two link elements constituting each of the links in the raising/lowering device on a right side are arranged in an overlapping manner to be different from each other in the vehicle approach direction.

6. The vehicle lift device according to claim 4, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

7. The vehicle lift device according to claim 3, wherein each of the links constituting the undulating link device of each of the raising/lowering devices is configured using an assembly of two link elements that form a pair, and each of two link elements constituting each of the links in the raising/lowering device on a left side and each of two link elements constituting each of the links in the raising/lowering device on a right side are arranged in an overlapping manner to be different from each other in the vehicle approach direction.

8. The vehicle lift device according to claim 7, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

9. The vehicle lift device according to claim 3, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

10. The vehicle lift device according to claim 2, wherein when the vehicle support table of each of the raising/lowering devices is positioned at a lift-up position and an intersection of the first and second links is arranged to be higher than each of existing front and rear work floors, a triangular inter-link gap, formed immediately below the intersection and above the work floor by being sandwiched between lower edges of the first and second links below the intersection, faces each of the front and rear work floors.

11. The vehicle lift device according to claim 10, wherein each of the links constituting the undulating link device of each of the raising/lowering devices is configured using an assembly of two link elements that form a pair, and each of two link elements constituting each of the links in the raising/lowering device on a left side and each of two link elements constituting each of the links in the raising/lowering device on a right side are arranged in an overlapping manner to be different from each other in the vehicle approach direction.

12. The vehicle lift device according to claim 11, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

13. The vehicle lift device according to claim 10, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

14. The vehicle lift device according to claim 2, wherein each of the links constituting the undulating link device of each of the raising/lowering devices is configured using an assembly of two link elements that form a pair, and each of two link elements constituting each of the links in the raising/lowering device on a left side and each of two link elements constituting each of the links in the raising/lowering device on a right side are arranged in an overlapping manner to be different from each other in the vehicle approach direction.

15. The vehicle lift device according to claim 14, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

16. The vehicle lift device according to claim 2, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

17. The vehicle lift device according to claim 1, wherein each of the links constituting the undulating link device of each of the raising/lowering devices is configured using an assembly of two link elements that form a pair, and each of two link elements constituting each of the links in the raising/lowering device on a left side and each of two link elements constituting each of the links in the raising/lowering device on a right side are arranged in an overlapping manner to be different from each other in the vehicle approach direction.

18. The vehicle lift device according to claim 17, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

19. The vehicle lift device according to claim 1, wherein each of the raising/lowering devices has each movable pit cover that is attached to a constituent link of the undulating link device to be capable of accompanying the undulating operation of the undulating link device, and when the vehicle support table is positioned at the lift-down position, the movable pit cover of each of the raising/lowering devices closes a part of the opening of the pit, which is not closed by the vehicle support table in the opening of the pit, and is separated upward from the opening of the pit during a process in which the vehicle support table is raised from the lift-down position.

20. The vehicle lift device according to claim 19, wherein each of the raising/lowering devices pivotally supports a lower end of the first link by the rotating support portion provided on a rack inside the pit, slidably supports a lower end of the second link, which has a length twice a length of the first link, by the sliding support portion provided on the rack inside the pit, pivotally attaches an upper end of the first link to an intermediate link together with a midpoint of the second link, pivotally attaches an upper end of the second link to the vehicle support table, pivotally attaches both ends of a first sub-link, which has an identical length to the first link, to the rack and the intermediate link to form a parallelogram link mechanism by four sections of the first link, the first sub-link, the rack, and the intermediate link, and pivotally attaches both ends of a second sub-link, which has a length half the length of the second link, to the vehicle support table and the intermediate link to form a parallelogram link mechanism by four sections of the second link, the second sub-link, the vehicle support table, and the intermediate link, and the movable pit cover is attached to the second sub-link.

\* \* \* \* \*